US010137057B2

(12) United States Patent
Yuyama et al.

(10) Patent No.: US 10,137,057 B2
(45) Date of Patent: Nov. 27, 2018

(54) TABLET CASSETTE

(71) Applicant: Yuyama Mfg. Co., Ltd., Toyonaka-shi, Osaka (JP)

(72) Inventors: Shoji Yuyama, Toyonaka (JP); Naoki Koike, Toyonaka (JP)

(73) Assignee: YUYAMA MFG. CO., LTD., Osaka (JP)

( * ) Notice: Subject to any disclaimer, the term of this patent is extended or adjusted under 35 U.S.C. 154(b) by 257 days.

(21) Appl. No.: 14/558,916

(22) Filed: Dec. 3, 2014

(65) Prior Publication Data

US 2015/0083746 A1 Mar. 26, 2015

Related U.S. Application Data

(60) Division of application No. 13/939,746, filed on Jul. 11, 2013, which is a continuation of application No. PCT/JP2012/050428, filed on Jan. 12, 2012.

(30) Foreign Application Priority Data

Jan. 14, 2011 (JP) ................................ 2011-006049

(51) Int. Cl.
*A61J 7/00* (2006.01)
*G07F 11/44* (2006.01)
(Continued)

(52) U.S. Cl.
CPC ........ *A61J 7/0076* (2013.01); *B65D 83/0409* (2013.01); *G07F 11/44* (2013.01); *G07F 17/0092* (2013.01)

(58) Field of Classification Search
CPC .......... A61J 1/03; A61J 7/0076; B65D 83/04; B65D 83/0409; G07F 11/24; G07F 17/0092; Y10T 83/0467
See application file for complete search history.

(56) References Cited

U.S. PATENT DOCUMENTS 3,128,011 A * 4/1964 Bleiman ................ G07F 11/44 221/154
3,604,559 A * 9/1971 McCall ............. B65D 83/0454 206/533
(Continued)

FOREIGN PATENT DOCUMENTS

EP 1 575 006 A1 9/2005
EP 2 671 564 A1 12/2013
(Continued)

OTHER PUBLICATIONS

PCT International Search Report dated Apr. 24, 2012 which is issued in a related PCT International Application No. PCT/JP2012/050428 (8 pages).

(Continued)

*Primary Examiner* — Gene O Crawford
*Assistant Examiner* — Kelvin L Randall, Jr.
(74) *Attorney, Agent, or Firm* — Robert P. Michal, Esq.; Carter, DeLuca, Farrell & Schmidt, LLP

(57) ABSTRACT

A tablet cassette is provided that can easily adjust the width of a guide groove of a rotor depending on the size of a tablet to be dispensed. The tablet cassette includes a groove width adjustment mechanism that relatively moves both sides of each of the tablet guide grooves in a circumferential direction of the rotor.

4 Claims, 22 Drawing Sheets

(51) Int. Cl.
*G07F 17/00* (2006.01)
*B65D 83/04* (2006.01)

(56) References Cited

U.S. PATENT DOCUMENTS

| | | | | |
|---|---|---|---|---|
| 3,722,740 | A * | 3/1973 | List | B65G 47/1428 221/169 |
| 4,869,394 | A * | 9/1989 | Hurst | G06M 7/02 221/186 |
| 5,219,095 | A | 6/1993 | Shimizu et al. | |
| 5,803,309 | A | 9/1998 | Yuyama et al. | |
| 7,040,505 | B2 | 5/2006 | Hashimoto et al. | |
| 8,622,241 | B2 * | 1/2014 | Geboers | A61J 7/0084 206/533 |
| 8,869,969 | B2 * | 10/2014 | Cie Iikowski | A24D 3/0216 198/479.1 |
| 9,181,017 | B2 * | 11/2015 | Bae | A61J 7/0084 |
| 2006/0249525 | A1 * | 11/2006 | Handfield | A61J 7/0084 221/162 |
| 2007/0150092 | A1 * | 6/2007 | Ohmura | G06F 19/3462 700/231 |
| 2008/0029535 | A1 | 2/2008 | Kim | |
| 2008/0099499 | A1 | 5/2008 | Kim | |
| 2011/0163112 | A1 | 7/2011 | Takahama | |
| 2012/0003928 | A1 * | 1/2012 | Geboers | A61J 7/0084 455/41.1 |
| 2012/0006700 | A1 * | 1/2012 | Geboers | A61J 7/0084 206/216 |
| 2014/0084020 | A1 * | 3/2014 | Yoshinori | G07F 11/005 221/82 |
| 2014/0183208 | A1 * | 7/2014 | Bae | A61J 7/0084 221/91 |
| 2014/0277702 | A1 * | 9/2014 | Shaw | G06F 19/3462 700/232 |
| 2014/0339252 | A1 * | 11/2014 | Bae | G07F 17/0092 221/277 |
| 2015/0090733 | A1 * | 4/2015 | Park | B65D 83/0409 221/1 |
| 2016/0068328 | A1 * | 3/2016 | 'T Lam | B65B 35/08 53/475 |

FOREIGN PATENT DOCUMENTS

| | | | |
|---|---|---|---|
| GB | 913 384 | A | 12/1962 |
| GB | 1 558 379 | A | 12/1976 |
| JP | 61-32120 | U | 2/1986 |
| JP | 08-164904 | A | 6/1996 |
| JP | 09-039910 | A | 2/1997 |
| JP | 10-035879 | A | 2/1998 |
| JP | 2005-247355 | A | 9/2005 |
| KR | 20-0438560 | Y1 | 2/2008 |
| WO | WO 2013/037364 | A2 | 3/2013 |

OTHER PUBLICATIONS

Extended European Search Report from European Patent Office, which was issued in a related European Patent Application No. 12734001.6 dated Jun. 23, 2014 (9 pages).

Extended European Search Report from European Patent Office, which was issue in a related European Patent Application No. 14157202.4 dated Jun. 25, 2014 (9 pages).

Extended European Search Report from European Patent Office, which was issued in a related European Patent Application No. 14157203.2 dated Jun. 25, 2014 (9 pages).

Office Action issue in U.S. Appl. No. 13/939,746 dated Mar. 27, 2015 (6 pages).

* cited by examiner

*Fig. 17(a)*
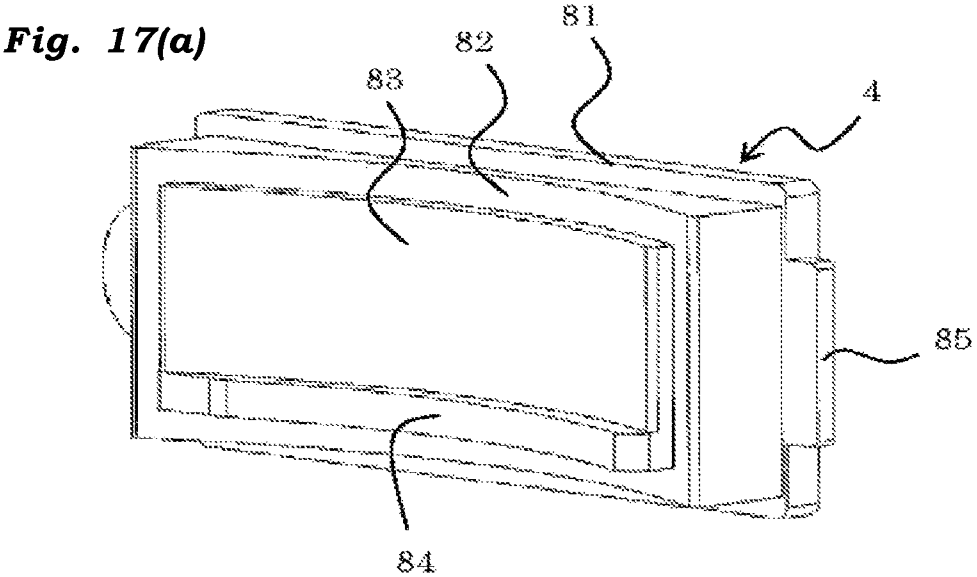
*Fig. 17(b)*
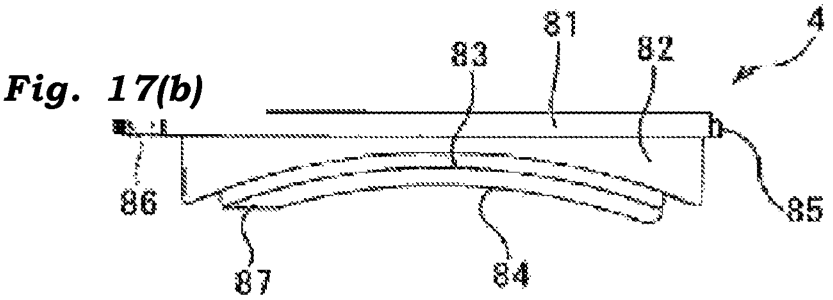
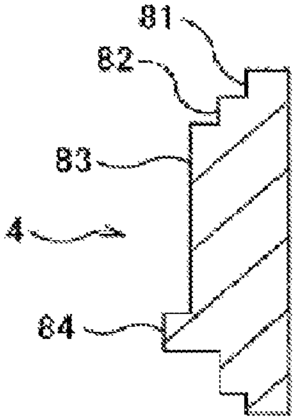
*Fig. 17(c)*
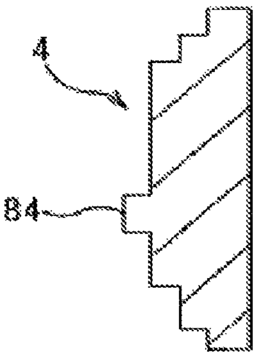
*Fig. 17(d)*
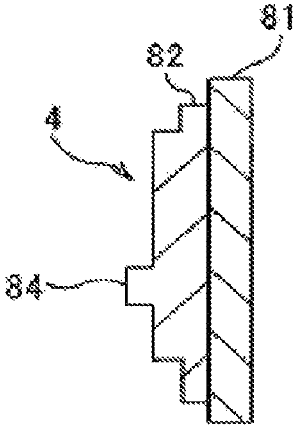
*Fig. 17(e)*

TABLET CASSETTE

CROSS-REFERENCE TO RELATED APPLICATIONS

This is a Divisional of U.S. patent application Ser. No. 13/939,746 filed Jul. 11, 2013, which is a Continuation of PCT International Application PCT/JP2012/050428 filed Jan. 12, 2012, which in turn claims priority of Japanese Application No. JP 2011-006049 filed Jan. 14, 2011, the entire disclosure of each of which is incorporated herein by reference.

TECHNICAL FIELD

The present invention relates to a tablet cassette that is mounted in a tablet storing and dispensing apparatus, which contains a large number of tablets for each type and dispenses a required number of tablets in accordance with prescription.

BACKGROUND INFORMATION

As described in Patent Document 1, a tablet cassette has been structured as follows: a rotatably-driven rotor is disposed in a bottom of a cassette body; the outer peripheral surface of the rotor is formed with a plurality of guide grooves in an axial direction and a circumferential groove in a circumferential direction; the guide groove is communicated with a tablet outlet formed in the bottom of the cassette body; a partitioning member is attached to the outer surface of the cassette body so as to enter the circumferential groove of the rotor; and the lowermost tablet and another tablet placed thereon, which are introduced to the guide groove, are separated from each other by the partitioning member so that only the lowermost tablet is dispensed from the tablet outlet. Patent Document 2 further describes a similar partitioning member that is inserted in an insertion hole of a cassette body and is secured by a cover. The aforementioned tablet cassettes need to use the rotor that has a different guide groove depending on the size of the tablet, and also need to change the attachment position of the partitioning member.

Thus, various proposals have been made so as to dispense a plurality of types of tablets having different sizes using the same tablet cassette.

Patent Document 3 discloses a tablet cassette configured as follows: a rotor includes a core body and an outer cylindrical body releasably engaging the core body; the outer cylindrical body having a guide groove with different width and depth is replaceable depending on the size of the tablet to be dispensed; a partitioning member is configured to be movable up and down by tightening or loosening a bolt; and the position of the partitioning member is changed depending on the size of the tablet to be dispensed. However, the above-described structure requires two complicated tasks, i.e., a change of the outer cylinder bodies and replacement of the partitioning member. Patent Document 3 also discloses that a ring body is fitted between the outer surface of the rotor and the inner surface of the cassette body to reduce the cross-section of the guide groove, and that a groove-depth adjuster movable in a radial direction is provided on a bottom of the guide groove so as to adjust the depth of the guide groove. However, it is difficult to mount and fix the ring body, and moving and fixing the groove-depth adjuster for each guide groove are complicated and time-consuming. Since the outer cylindrical bodies and the ring bodies are changed according to the shape of the tablet, replacement parts therefor are required.

Patent Document 4 discloses the following structure: a plurality of insertion holes are provided in a cassette body, and a partitioning member is fitted and fixed to the insertion hole located at a height corresponding to the size of a tablet; alternatively, a plurality of insertion holes and positioning holes are provided, the partitioning member is inserted in the insertion hole located at a height corresponding to the size of a tablet, and a pin provided in the partitioning member is fitted into the positioning hole to fix the partitioning member. However, the above-described structure has a problem that it cannot adjust the entry amount of the partitioning member to a guide groove.

In Patent Documents 1 to 4, the lowermost tablet and another tablet placed thereon, which are introduced to the guide groove, are separated from each other by the partitioning member, and these tablets make a sliding contact with the partitioning member as the rotor rotates. This results in a problem that the tablets are easily damaged.

PRIOR ART DOCUMENTS

Patent Documents

Patent Document 1: JP 9-39910 A
Patent Document 2: Korean Utility Model Registration 20-0438560
Patent Document 3: JP 8-164904 A
Patent Document 4: JP 2005-247355 A

SUMMARY OF THE INVENTION

Problems to be Solved

An object of the present invention, which has been made in view of the foregoing problems in the prior art, is to provide a tablet cassette that can easily adjust the width and depth of a guide groove of a rotor and the separation position of tablets depending on the size of a tablet to be dispensed, and requires no replacement members.

Means for Solving the Problems

In order to solve the problems, a first aspect of the present invention provides a tablet cassette that includes, with regard to the adjustment of the depth of guide grooves:

a cassette body for storing tablets; and a rotor that is disposed rotatably in a bottom of a tablet container of the cassette body, the rotor having an outer peripheral surface on which a plurality of tablet guide grooves extending in an axial direction are formed, the tablet cassette further including:

a plurality of movable pieces that are disposed movably in a radial direction of the rotor in the plurality of tablet guide grooves and form surfaces in the radial direction of the rotor; and a movable piece moving mechanism that moves the movable pieces in the radial direction of the rotor.

Preferably, the movable piece moving mechanism includes:

a rotor core member having a plurality of guide grooves for guiding the plurality of movable pieces in the radial direction of the rotor;

a movable piece driving plate that is disposed rotatably relative to the rotor core member and has a plurality of guide holes with which the plurality of movable pieces are engaged; and a rotation mechanism for rotating the movable piece driving plate.

Preferably, the tablet cassette further includes a groove width adjustment mechanism that relatively moves both sides of each of the tablet guide grooves in a circumferential direction.

A second aspect of the present invention of the present invention provides a tablet cassette that includes, with regard to the adjustment of the depth of guide grooves:

a cassette body for storing tablets; and a rotor that is disposed rotatably in a bottom of a tablet container of the cassette body, the rotor having an outer peripheral surface on which a plurality of tablet guide grooves extending in an axial direction are formed, wherein the tablet cassette further includes a groove width adjustment mechanism that relatively moves both sides of each of the tablet guide grooves in an circumferential direction of the rotor.

Preferably, the groove width adjustment mechanism includes:

a first movable plate that has a plurality of first adjustment walls, each of the plurality of first adjustment walls having a first side surface that forms one side of each of the plurality of tablet guide grooves;

a second movable plate that is disposed rotatably relative to the first movable plate and has a plurality of second adjustment walls, each of the plurality of second adjustment walls having a second side surface that forms the other side of each of the plurality of tablet guide grooves opposed to the first side surface of the first movable plate; and a movable plate moving mechanism for relatively rotating the first and second movable plates.

Preferably, the movable plate moving mechanism includes:

a first adjustment hole and a second adjustment hole formed in the first movable plate;

a third adjustment hole and a fourth adjustment hole formed in the first movable plate, the third adjustment hole intersecting the first adjustment hole and the fourth adjustment hole intersecting the second adjustment hole; and an operating member having a first adjustment pin that fits into the first and third adjustment holes and a second adjustment pin that fits into the second and fourth adjustment holes.

With regard to the adjustment of the separation position of tablets, a third aspect of the present invention provides a tablet cassette including a cassette body for storing tablets, and a rotor that is disposed rotatably in a bottom of a tablet container of the cassette body, the rotor having an outer peripheral surface on which a plurality of tablet guide grooves extending in an axial direction are formed, the tablet cassette further including a tablet holding member that is rotatable together with the rotor and is elastically deformable so as to enter the tablet guide groove from an opening end thereof and to press a tablet in the tablet guide groove, and a pressing member that is mounted on the cassette body and presses the tablet holding member toward the tablet guide groove when the tablet guide groove is located at a position corresponding to a tablet outlet provided in the cassette body.

The tablet holding member may include a plurality of elastic pieces disposed along the tablet guide groove, and The pressing member may be replaceable so as to contact with one of the plurality of elastic pieces.

Alternatively, the tablet holding member may include a plurality of elastic pieces disposed along the tablet guide groove, and The pressing member may be position-adjustable in a direction of the tablet guide groove so as to contact with one of the plurality of elastic pieces.

Preferably, the tablet holding member includes elastic pieces, and each of the elastic pieces has a pressing portion for pressing a tablet in the tablet guide groove and a raised portion for causing the pressing portion to enter the tablet guide groove by contacting with the pressing member.

Effect

According to the first aspect of the present invention, the movable piece moving mechanism moves the movable piece in each of the plurality of tablet guide grooves in a radial direction of the rotor depending on the size of a tablet, so that the bottom position, i.e., groove depth, of the tablet guide groove can be adjusted. Thus, tablets can be dispensed with no replacement of the rotor even if various tablets with different sizes are stored, and no replacement parts are required.

According to the second aspect of the present invention, the movable piece moving mechanism relatively rotates a first movable plate and a second movable plate depending on the size of a tablet, so that a distance, i.e., groove width, between opposite sides of the tablet guide groove can be adjusted. Thus, tablets can be dispensed with no replacement of the rotor even if various tablets with different sizes are stored, and no replacement parts are required.

According to the third aspect of the present invention, when the tablet guide groove of the rotor approaches the pressing member, the tablet holding member attached to the outer peripheral surface of the rotor is pushed toward the rotor, and enters the tablet guide groove to hold a tablet in the tablet guide groove. This can separate a lower tablet from the held tablet to discharge the lower tablet to the outside along the tablet guide groove. Thus, since the tablet holding member rotatable together with the rotor holds a tablet introduced in the guide groove, the tablet and the tablet holding member have no sliding contact with each other, and thereby the tablets are hardly damaged.

Furthermore, adjustment of the position of the pressing member depending on the size of the tablet allows the tablet holding member pressed by the pressing member to be selected, and the separation position of the tablet to be changed. Thus, tablets can be dispensed with no replacement of the rotor even if various tablets with different sizes are stored, and no replacement parts are required.

BRIEF DESCRIPTION OF THE DRAWINGS

FIGS. 17A, 17B, and 17C are a perspective view, a plan view, and a cross-sectional view of a pressing member, respectively, and FIGS. 17D and 17E are modifications of FIG. 17C.

DETAILED DESCRIPTION

The embodiments of the present invention will now be described with reference to the accompanying drawings.

FIGS. 1 to 4 illustrate a tablet cassette 1 according to the present invention. The tablet cassette 1 includes a cassette body 2, a rotor 3, and a pressing member 4.

Figure 1:
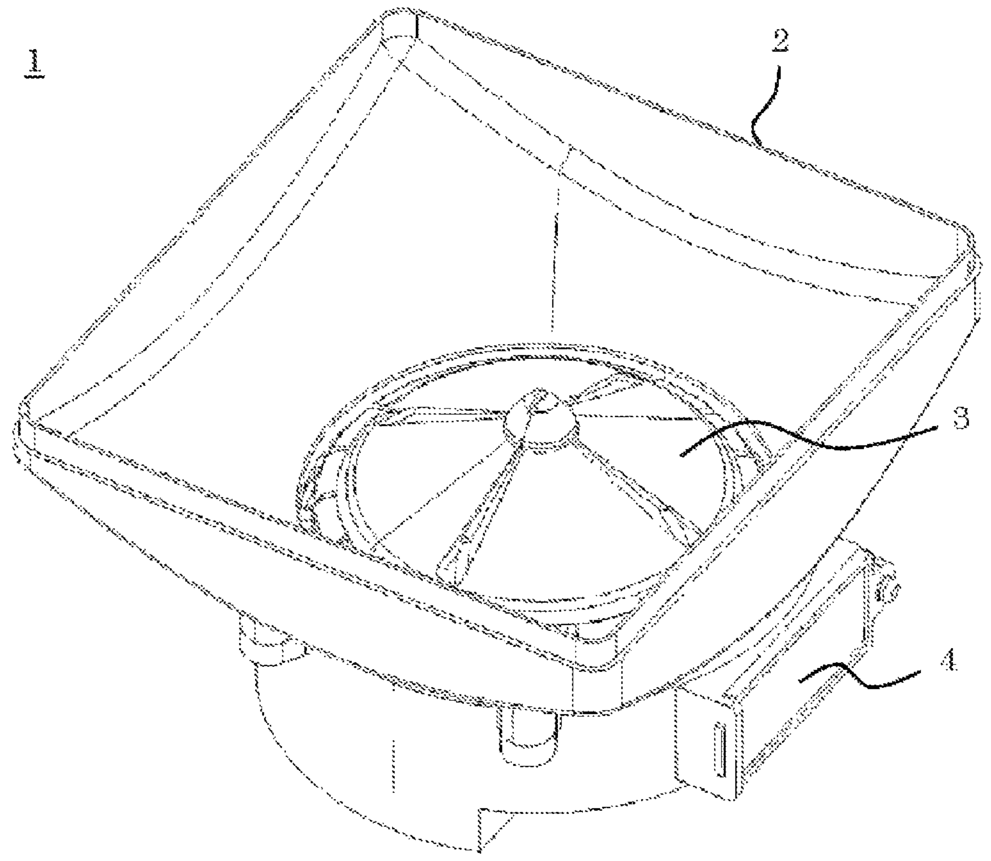
FIG. 1 is a perspective view, obliquely from above, of a tablet cassette according to the present invention.
Figure 2:
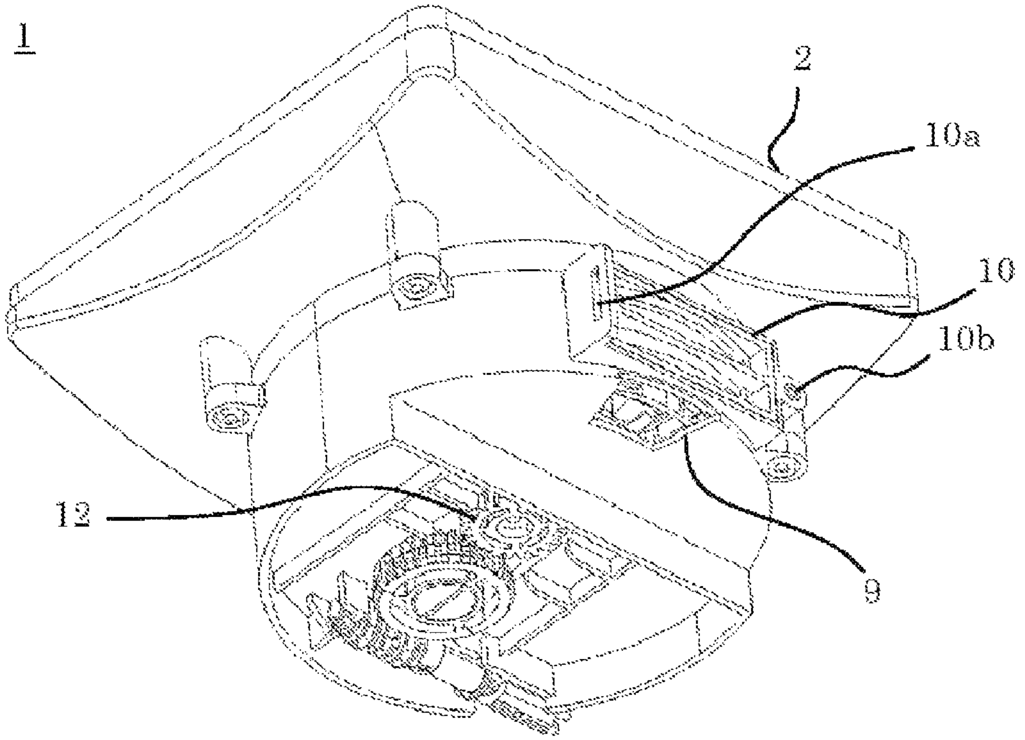
FIG. 2 is a perspective view, obliquely from below, of the tablet cassette.
Figure 3:
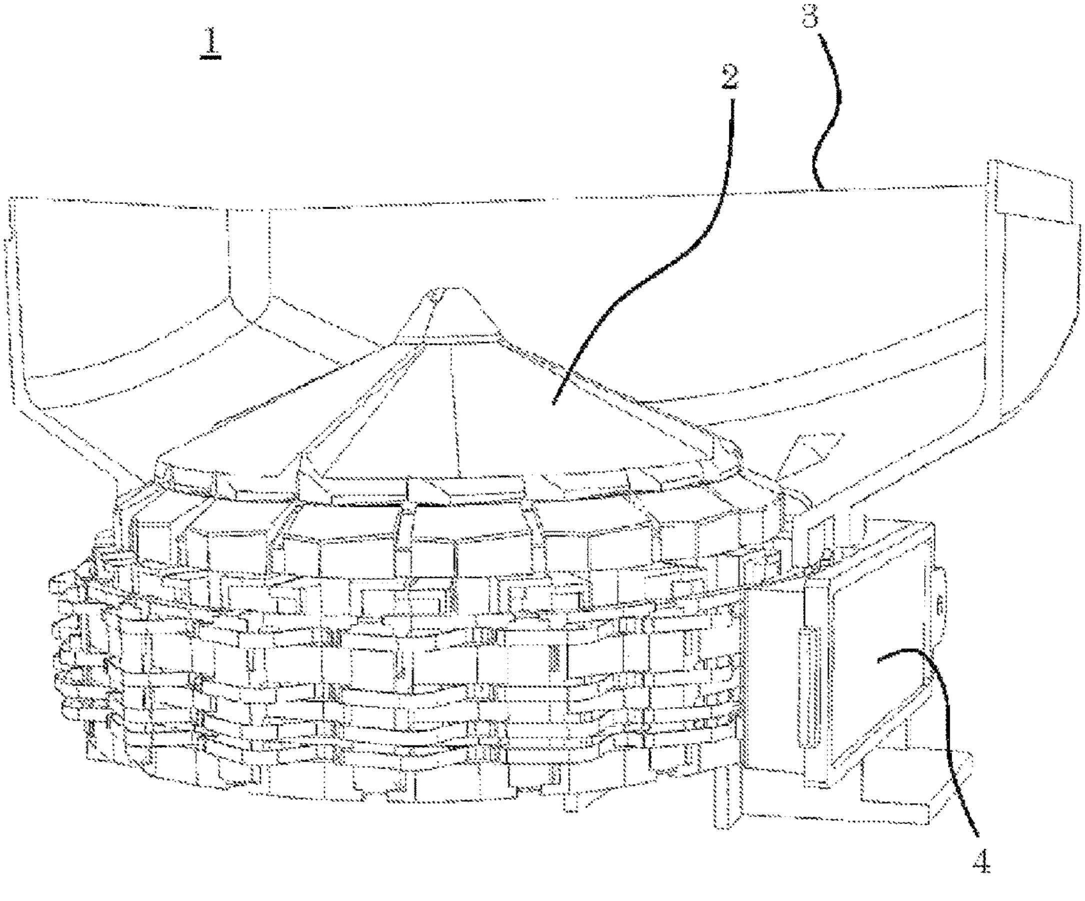
FIG. 3 is a perspective view, partially broken away, of a cassette body of the tablet cassette.
Figure 4:
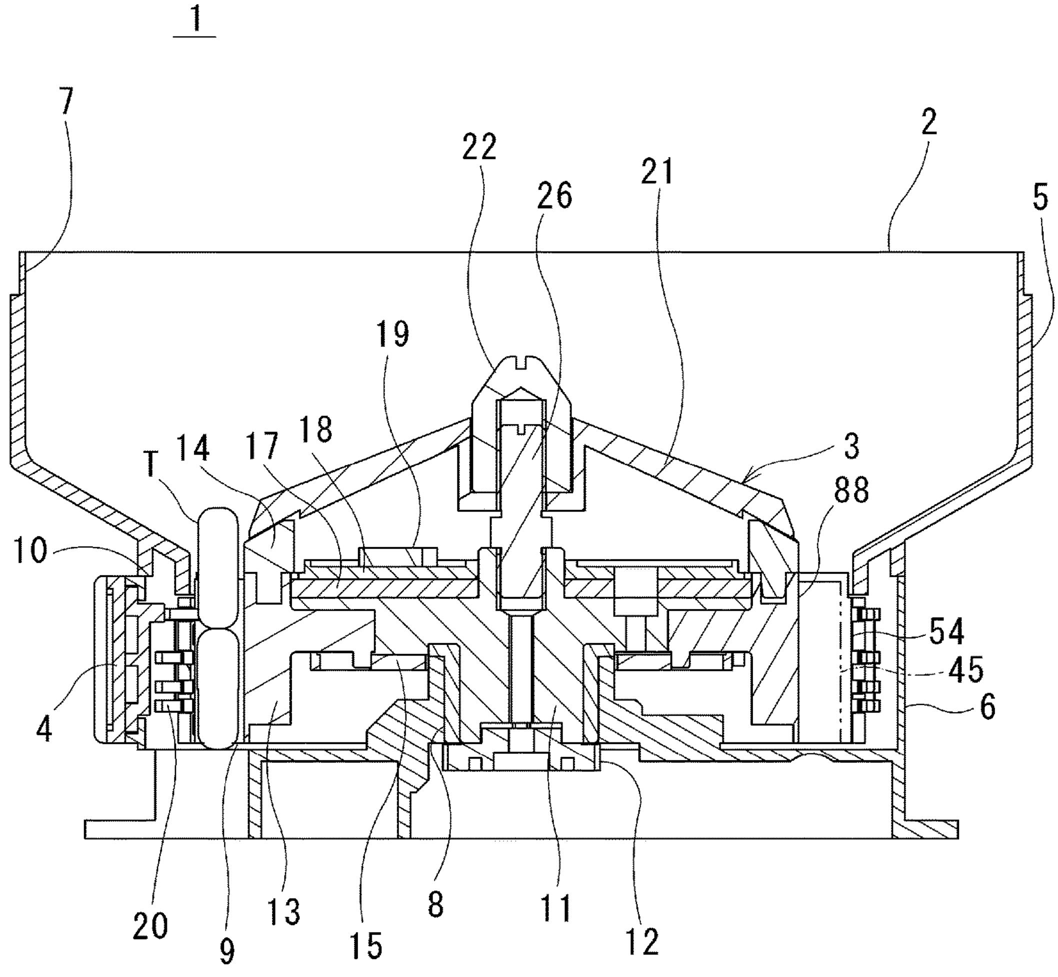
FIG. 4 is a cross-sectional view of the tablet cassette.

As shown in FIG. 4, the cassette body 2 includes a tablet container 5 for storing a large number of tablets and a rotor housing 6 that is disposed below the tablet container 5 and houses the rotor 3. The tablet container 5 has a rectangular opening 7 that opens upward, the opening 7 being covered with an openable and closable lid (not shown). The rotor housing 6 has a cylindrical shape with a bottom surface. The bottom surface is formed with a rotor shaft hole 8 in the center of the bottom surface and a tablet discharge hole 9 on the outer periphery of the bottom surface. The rotor shaft hole 8 is fitted with a cylindrical bush. A mounting mouth 10 for mounting the pressing member 4 is formed in the vicinity of the tablet discharge hole 9. One edge of the mounting opening 10 is provided with a slit 10*a* with which a claw 85 of the pressing member 4 is engaged, and the other edge thereof is provided with a screw hole 10*b* that matches a screw insertion hole 86 of the pressing member 4.

Figure 5:
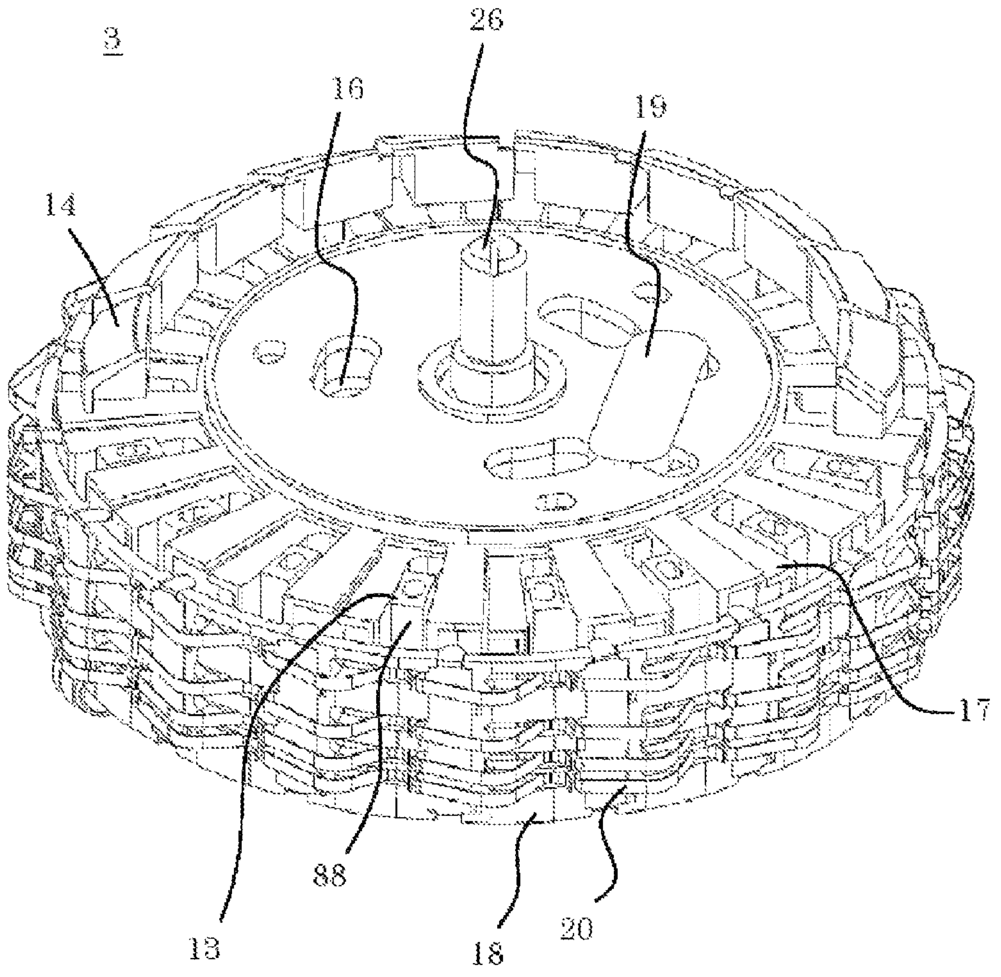
FIG. 5 is a perspective view of a rotor.
Figure 6:
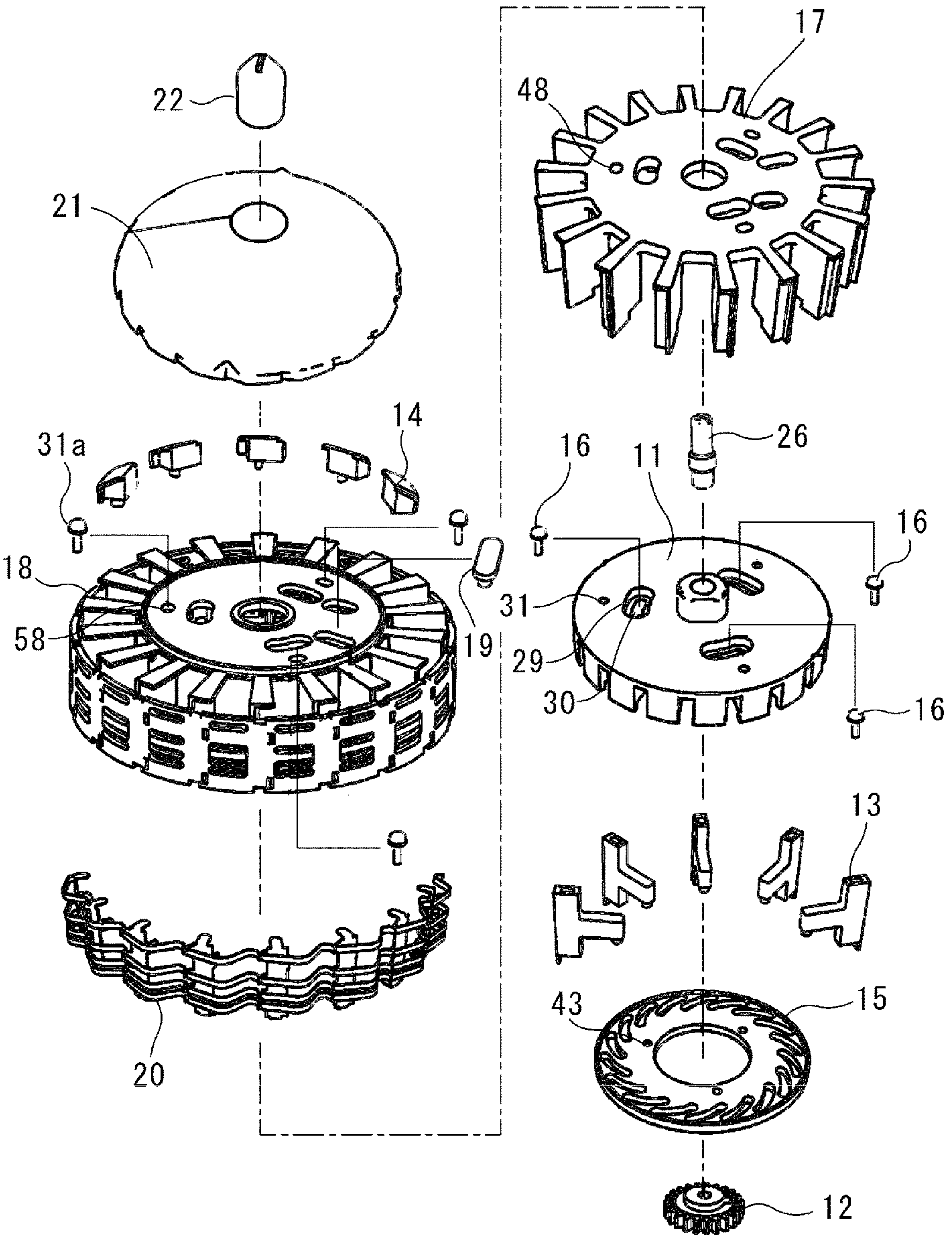
FIG. 6 is an exploded perspective view of the rotor.

FIG. 5 shows the assembled state of the rotor. As shown in FIG. 6, the rotor 3 includes a rotor core member 11, a drive gear 12, movable pieces 13, movable piece upper members 14, a movable piece driving plate 15, groove depth adjustment screws 16, a first movable plate 17, a second movable plate 18, a groove width adjustment member 19, tablet holding members 20, a rotor cover 21, and a rotor cap 22.

Figure 7A:
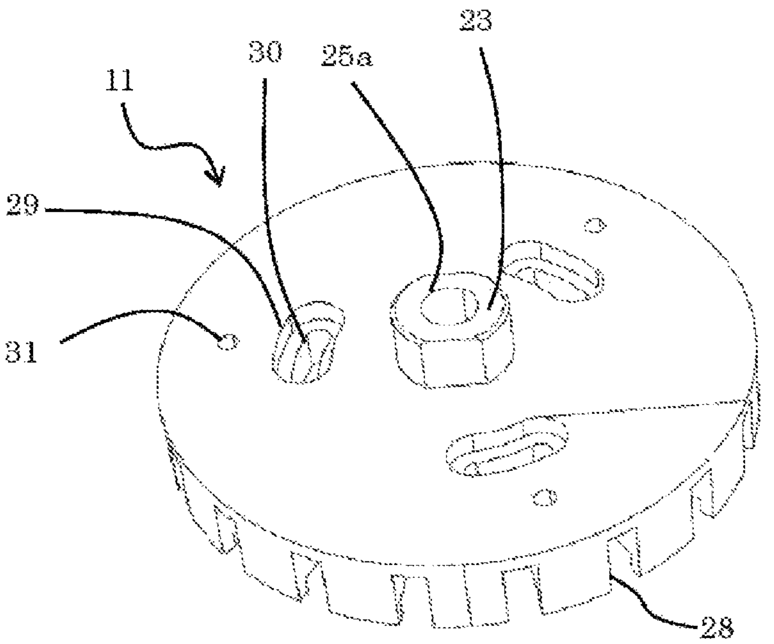
FIGS. 7A and 7B are perspective views, from above and below respectively, of a rotor core member.
Figure 7B:
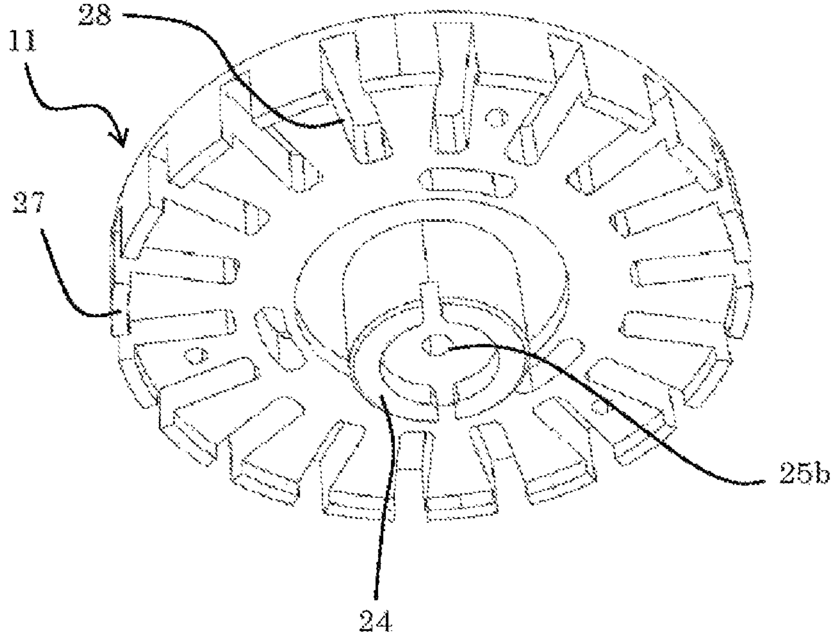

As shown in FIG. 7, the rotor core member 11 is disc-shaped, and has a cylindrical upward projection 23 in the center of its upper surface and a downward projection 24 having a larger diameter than the upward projection 23 in the center of its lower surface. The upward projection 23 and the downward projection 24 are provided with shaft holes 25*a* and 25*b*, respectively. A rotor shaft 26 is screwed and fixed into the shaft hole 25*a* of the upward projection 23. The outer peripheral edge of the lower surface of the rotor core member 11 is provided with a downwardly projecting annular rib 27. A plurality (18 in the embodiment) of guide grooves 28 are formed radially at equal intervals toward the center from the outer peripheral edge of the lower surface of the rotor core member 11. The rotor core member 11 has a plurality (three in the embodiment) of arc-shaped recesses 29 centered on the shaft hole 25*a* and formed at equal intervals. The bottoms of the recesses 29 are provided with arc-shaped elongated holes 30. In the vicinity of the recesses 29, the rotor core member 11 further has a plurality (three in the embodiment) of mounting holes 31 on the same circle centered on the shaft hole 25*a*.

As shown in FIG. 4, the drive gear 12 is engaged with the downward projection 24 of the rotor core member 11 and is fixed by screwing a mounting screw (not shown) into the shaft hole 25*b* of the downward projection 24.

Figure 8:
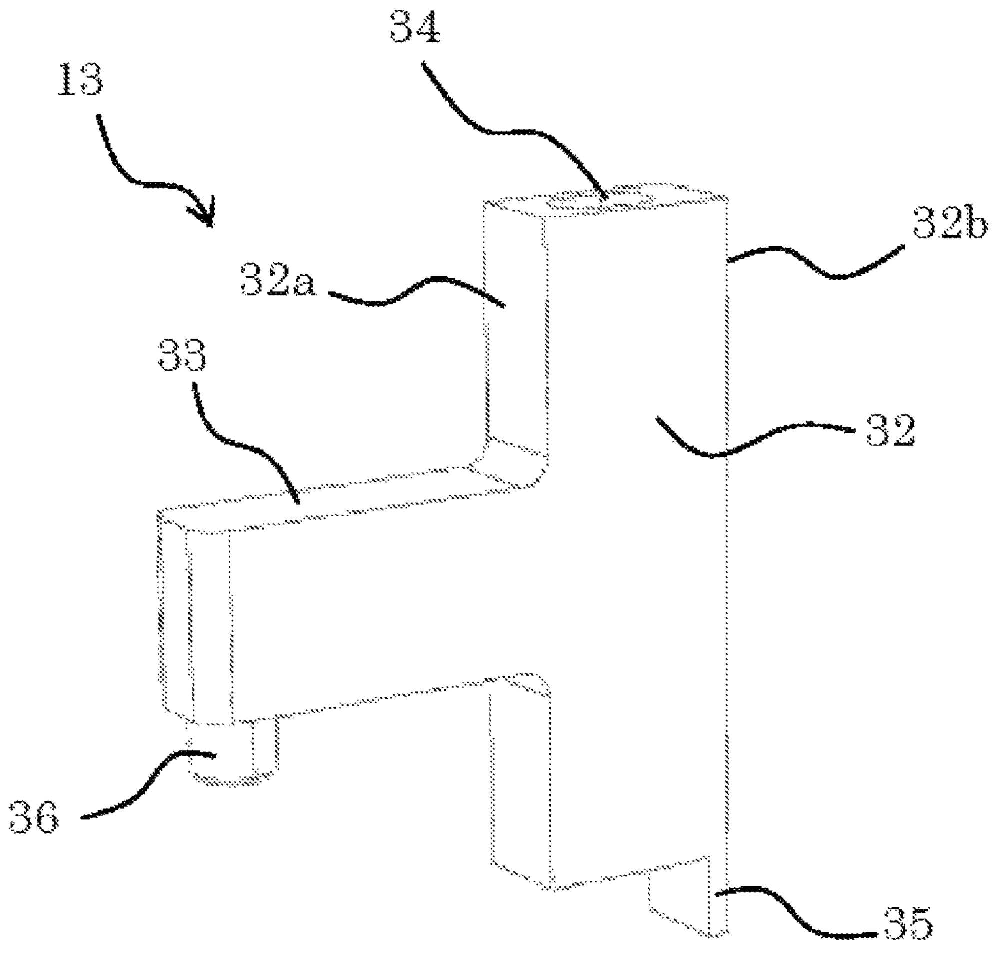
FIG. 8 is a perspective view of a movable piece.

As shown in FIG. 8, the movable pieces 13 of the same number as the number of the guide grooves 28 of the rotor core member 11 are provided. The movable piece 13 has a plate-shaped base 32 extending in an axial direction of the rotor 3, and a guide arm 33 extending inwardly and horizontally from the inner surface 32*a* of the base 32 (hereinafter, a surface facing the shaft hole 25*a* of the rotor core member 11 is referred to as an inner surface, and a surface on the opposite side thereof is referred to as an outer surface). An outer surface 32*b* of the base 32 defines a radial surface (bottom surface) of the rotor 3 in a tablet guide groove (described below) of the rotor 3. The upper surface of the base 32 is provided with a fitting hole 34 into which the movable piece upper member 14 is fitted. The lower end of the base 32 has a projecting piece 35 flush with the outer surface. The distal end of the guide arm 33 is provided with a circular projection 36 protruding downward.

Figure 9A:
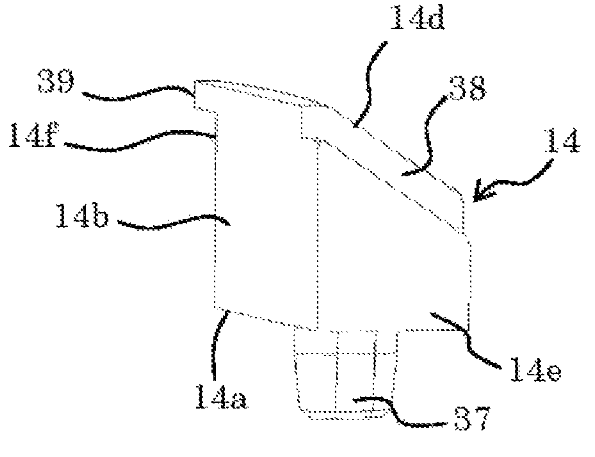
FIGS. 9A, 9B, and 9C are perspective views, from three directions above, of a movable piece upper member.
Figure 9B:
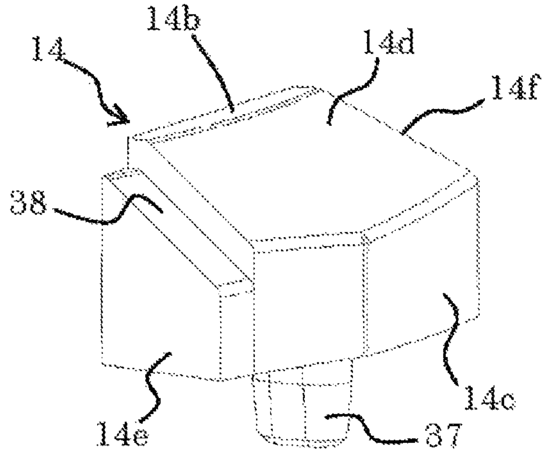
Figure 9C:
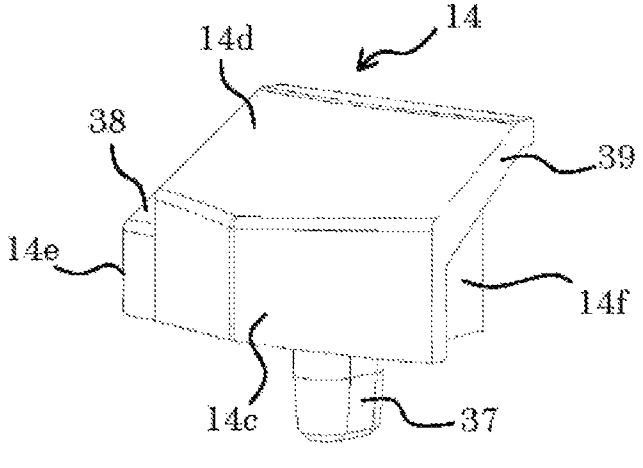

The movable piece upper members 14 of the same number as the number of the movable pieces 13 are provided. As shown in FIG. 9, the movable piece upper member 14 is a hexahedron including a horizontal lower surface 14*a*, an inner surface 14*b* perpendicular to the horizontal lower surface 14*a*, a bent outer surface 14*c*, an inclined top surface 14*d*, and side surfaces 14*e*, 14*f* forming part of vertical planes passing through the shaft hole 25 of the rotor core member 11. The lower surface 14*a* is provided with a fitting projection 37 that fits into a fitting hole 34 of the base 32 of the movable piece 13. The inclined top surface 14*d* has a surface shape that is lower from the inner surface toward the outer surface and where the edge of the outer surface side is higher from one side surface 14*e* toward the other side surface 14*f*. The upper edge of the one side surface 14*e* is provided with a cut-out portion 38 extending from the inner surface 14*b* to the outer surface 14*c*. The other side surface 14*f* is provided with a projecting portion 39 extending from the inner surface 14*b* toward the outer surface 14*c*. Thus, the cut-out portion 38 and the projecting portion 39 of adjacent movable piece upper members 14 are formed so as to be overlapped.

Figure 10:
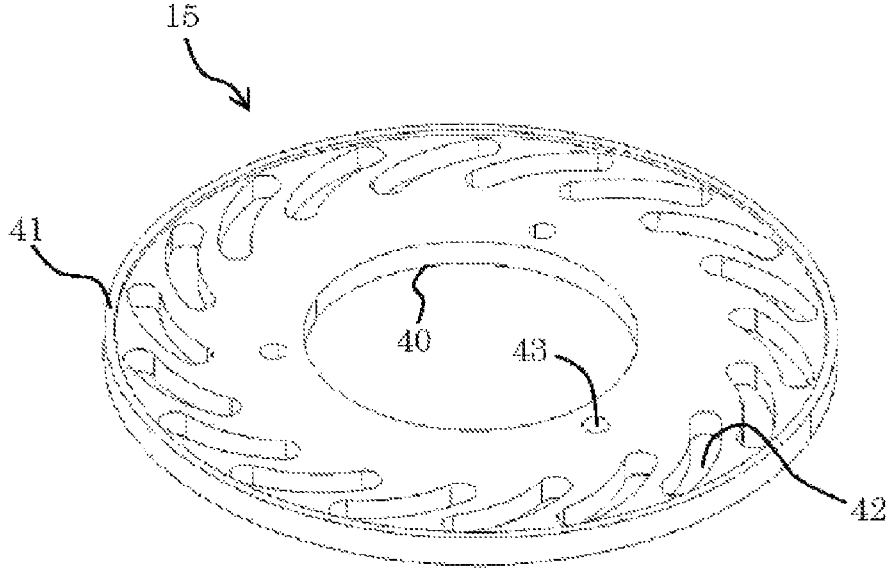
FIG. 10 is a perspective view of a movable piece driving plate.

As shown in FIG. 10, the movable piece driving plate 15 has a disc shape that is mounted rotatably within the annular rib 27 of the lower surface of the rotor core member 11. The center of the movable piece driving plate 15 is provided with a central hole 40 of a larger diameter than that of the downward projection 24 of the rotor core member 11. The outer peripheral edge of the movable piece driving plate 15 is provided with an upwardly projecting annular rib 41 to reduce the sliding resistance of the rotor core member 11. The outer peripheral side of the movable piece driving plate 15 is provided with arc-shaped guide holes 42 of the same number as the number of the movable pieces 13. One end of the guide hole 42 is located nearer the outer periphery, and the other end thereof is located nearer the inner periphery. The guide hole 42 need not necessarily be an arc shape. Alternatively, the guide hole 42 may be a linear shape that intersects a moving direction of the movable piece 13, i.e., the guide groove 28 of the rotor core member 11. The movable piece driving plate 15 has three screw holes 43 that are located at equal intervals on the same circle centered on the central hole 40 and at the positions corresponding to the three elongated holes 30 of the rotor core member 11.

As shown in FIG. 6, the groove depth adjustment screws 16 are screwed into the screw holes 43 of the movable piece driving plate 15 through the elongated holes 30 from the three recesses 29 of the rotor core member 11.

Figure 11A:
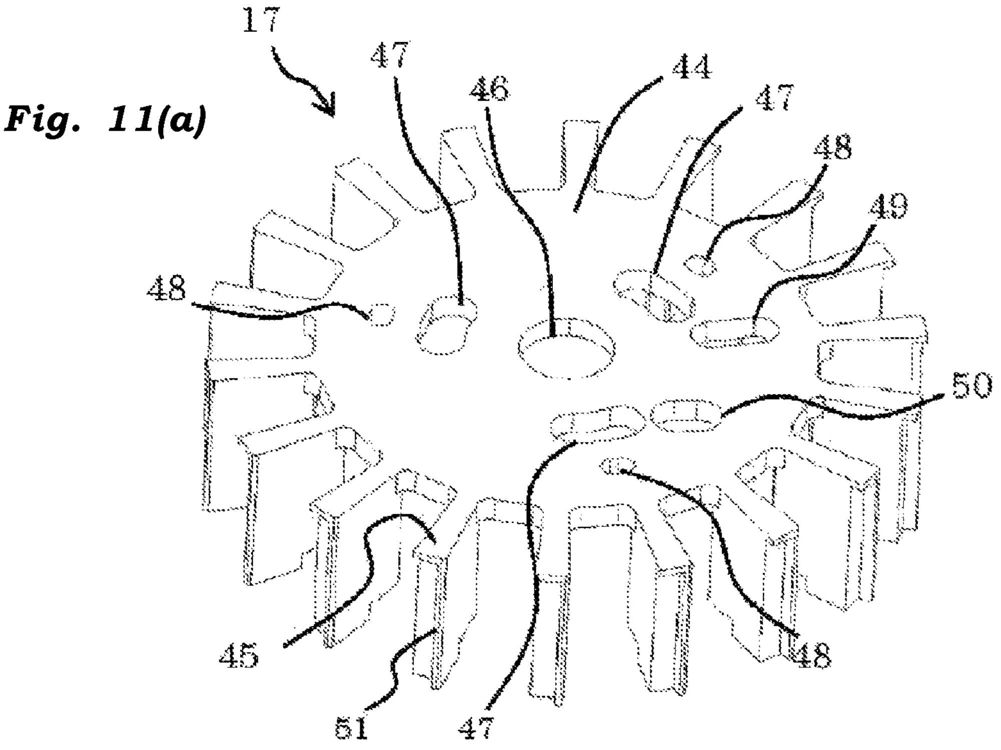
FIGS. 11A and 11B are perspective views, from above and below respectively, of a first movable plate.
Figure 11B:
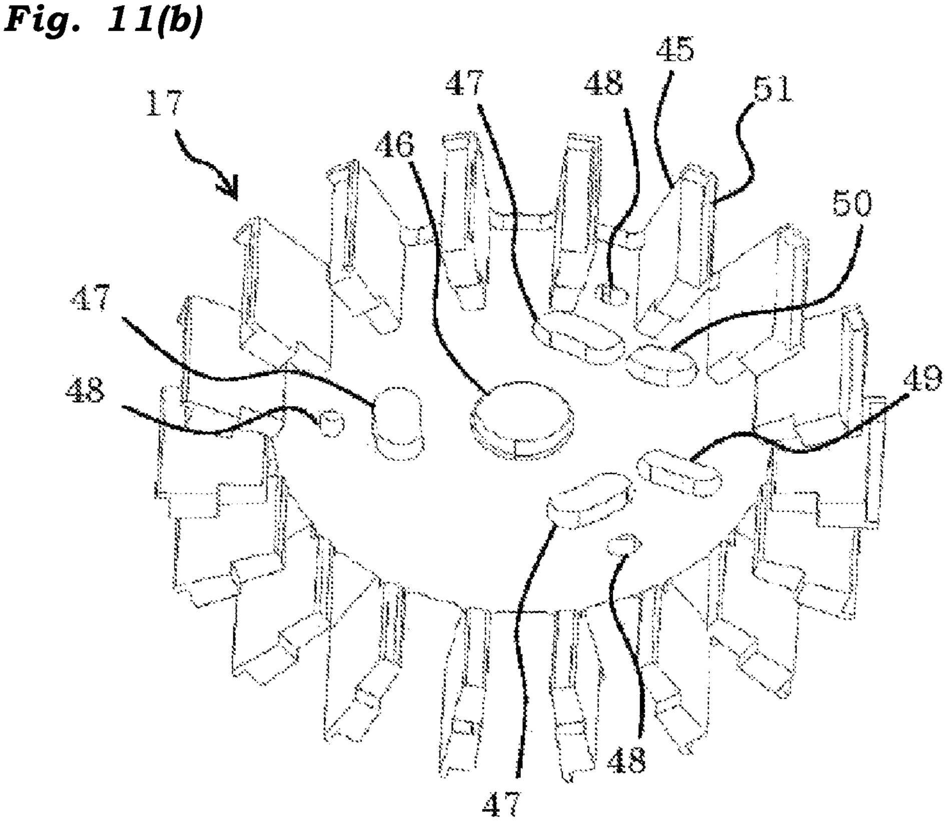

As shown in FIG. 11, the first movable plate 17 is mounted on the rotor core member 11, and includes a circular base plate 44, and adjustment walls 45 that extend radially outward at equal intervals in a circumferential direction from the outer peripheral edge of the base plate 44, the number of the adjustment walls 45 is equal to the number (18 in the embodiment) of the movable pieces 13 extending downward.

The base plate 44 has a central hole 46 that fits into the upward projection 23 of the rotor core member 11 in the center thereof. A plurality (three in the embodiment) of arcuate slots 47 having arc shapes centered on the central hole 46 are formed around the central hole 46 so as to face the recesses 29 of the rotor core member 11. A plurality (three in the embodiment) of screw insertion holes 48 having arc shapes centered on the central hole 46 are also formed on the outside of the arcuate slots 47 so as to face the mounting holes 31 of the rotor core member 11. In addition, the base plate 44 has a first elongated adjustment hole 49 and a second elongated adjustment hole 50 extending parallel from two points equidistant from the central hole 46. The length of the second elongated adjustment hole 50 is smaller than that of the first elongated adjustment hole 49.

The surface of the adjustment wall 45 seen from a clockwise direction in FIG. 11 (*a*) defines one side surface of the tablet guide groove 88 of the rotor 3. The distal end of the adjustment wall 45 is provided with a projecting piece 51 protruding radially outward in a reverse L-shape from the top surface and the side surface seen from the clockwise direction of the adjustment wall 45.

Figure 12A:
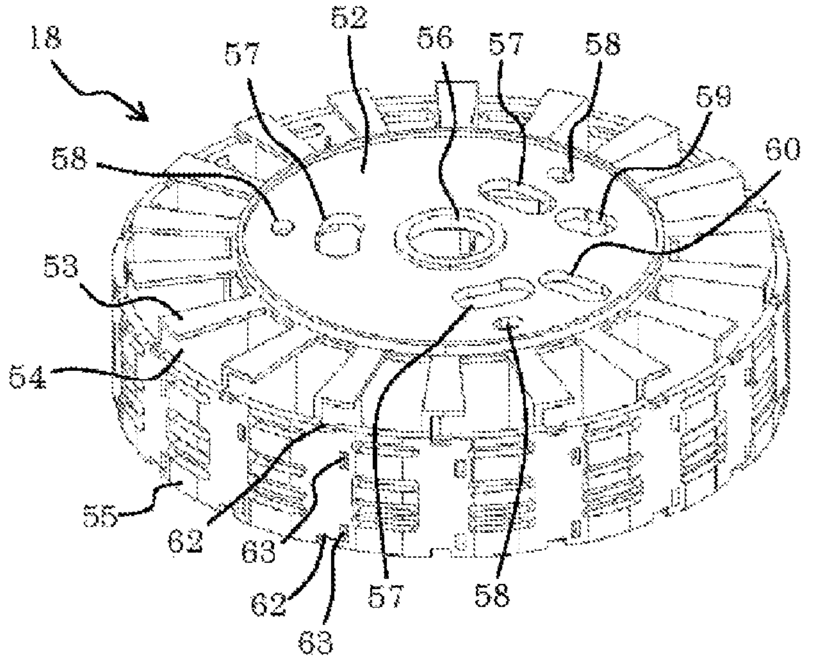
FIGS. 12A and 12B are perspective views, from above and below respectively, of a second movable plate.
Figure 12B:
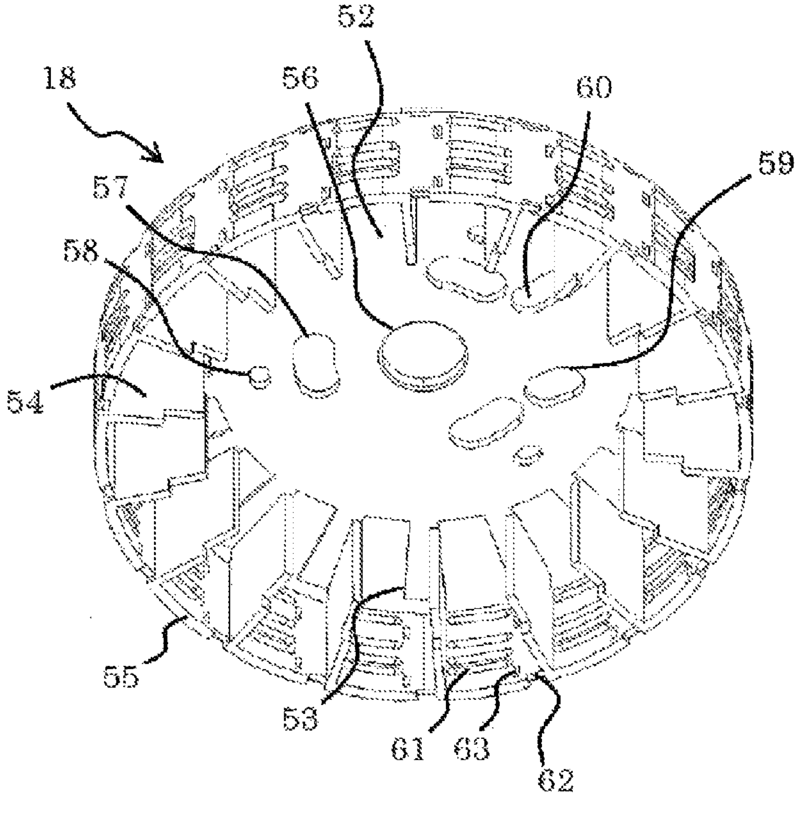

As shown in FIG. 12, the second movable plate 18 is mounted on the first movable plate 17, and includes a circular base plate 52, top walls 53 that extend radially outward at equal intervals in the circumferential direction from the outer peripheral edge of the base plate 52, the number of the top walls 53 being equal to the number (18 in the embodiment) of the movable pieces 13, adjustment walls 54 extending downward from one ends of the top walls 53, and outer walls 55 that connect the outer ends of the adjustment walls 54 and are cylindrical as a whole.

The base plate 52 has a central hole 56, arcuate slots 57, screw insertion holes 58, a third and a fourth elongated adjustment holes 59, 60 at positions corresponding to the central hole 46, the arcuate slots 47, the screw insertion holes 48, the first and second elongated adjustment holes 49, 50 of the first movable plate 17, respectively. Note that the third and fourth elongated adjustment holes 59, 60 of the second movable plate 18 extend parallel to a direction intersecting the first and second elongated adjustment holes 49, 50 of the first movable plate 17. The length of the third elongated adjustment hole 59 is equal to that of the second adjustment hole 50 of the first movable plate 17; the length of the fourth elongated adjustment hole 60 is equal to that of the first adjustment hole 49 of the first movable plate 17.

The surface of the adjustment wall 54 seen from the counterclockwise direction in FIG. 12 (*a*) defines one side surface of the tablet guide groove 88 of the rotor 3.

The outer wall 55 is provided between adjacent adjustment walls 54 with a plurality (four in the embodiment) of slits 61 that extend in the circumferential direction and through which the tablet holding member 20 described below enters, two cut-out portions 62 for mounting the tablet holding member 20, and two mounting holes 63 for mounting the tablet holding member 20.

As shown in FIG. 6, the first movable plate 17 is mounted on the rotor core member 11, and the second movable plate 18 is mounted on the first movable plate 17. The first movable plate 17 and the second movable plate 18 are fixed by inserting mounting screws 31*a* into the screw insertion holes 58 of the second movable plate 18 and the screw insertion holes 48 of the first movable plate 17 and by screwing the mounting holes 31 of the rotor core member 11. Loosening the mounting screws 31*a* allows the first and second movable plates 17, 18 to be rotatable relative to each other.

Figure 13:
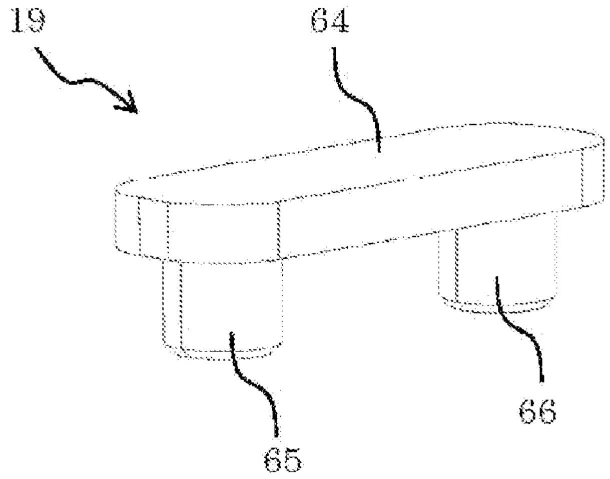
FIG. 13 is a perspective view of a groove width adjustment member.

As shown in FIG. 13, the groove width adjustment member 19 is mounted in the first and second elongated adjustment holes 49, 50 of the first movable plate 17, and in the third and fourth elongated adjustment holes 59, 60 of the second movable plate 18.

The groove width adjustment member 19 includes a base 64 having an elongated circular shape, a first adjustment pin 65 that projects from the lower surface of one end of the base 64 and is inserted into the first elongated adjustment hole 49 of the first movable plate 17 and the third elongated adjustment hole 59 of the second movable plate 18, and a second adjustment pin 66 that projects from the lower surface of the other end of the base 64 and is inserted into the second elongated adjustment hole 50 of the first movable plate 17 and the fourth elongated adjustment hole 60 of the second movable plate 18.

Figure 14A:
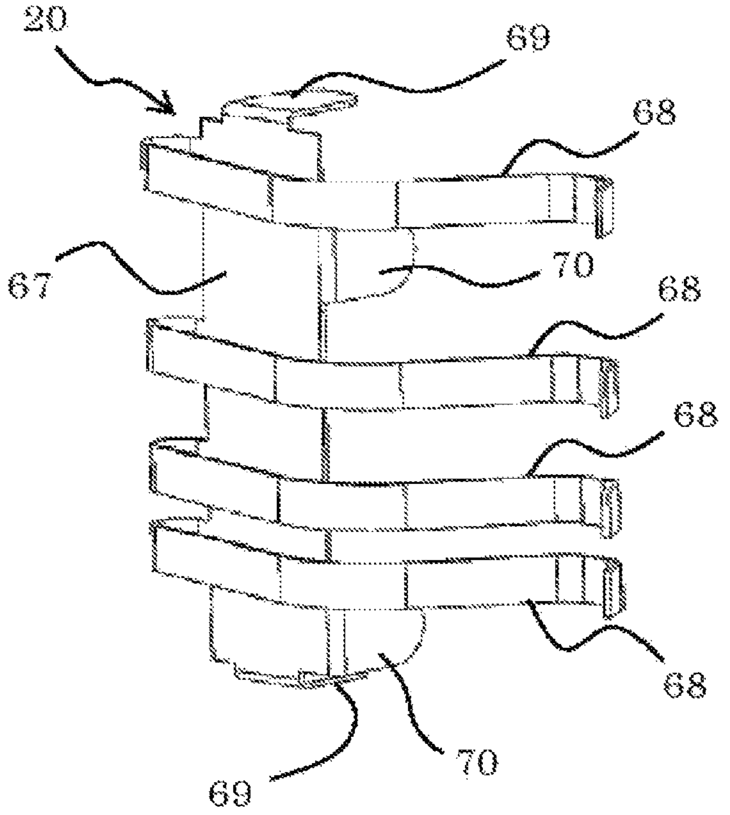
FIGS. 14A and 14B are a perspective view and a plan view of a tablet holding member, respectively.
Figure 14B:
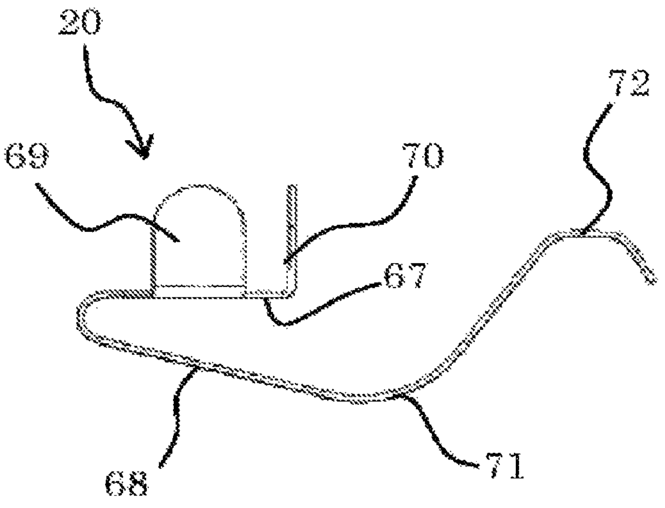

As shown in FIG. 14, the tablet holding member 20 is made of a metal material having a spring property such as stainless steel, and has a base 67 and four elastic pieces 68 extending from the base 67.

The base 67 is an elongated plate shape extending in a vertical direction, and has two engagement pieces 69 at the upper and lower ends thereof, the engagement pieces 69 being engaged with the cut-out portions 62 of the upper and lower ends of the outer wall 55 of the second movable plate 18 to be bent, and two insert pieces 70 at one side end that are inserted into the mounting holes 63 of the outer wall 55 of the second movable plate 18.

As shown in FIG. 14(*b*), the elastic piece 68 extends in a direction away from the base 67 along the outer wall 55 of the second movable plate 18 from the side end of the base 67 where no insert pieces 70 are formed, bends in a U-shape to extend gradually in a direction away from the base 67, bends in a direction approaching the outer wall 55 of the second movable plate 18 at a position across the base 67 to form a raised portion 71, bends gradually in a direction away from the outer wall 55 of the second movable plate 18 in the vicinity of the outer wall 55 of the second movable plate 18 to form a pressing portion 72, and terminates the place where the pressing portion is formed.

Figure 15A:
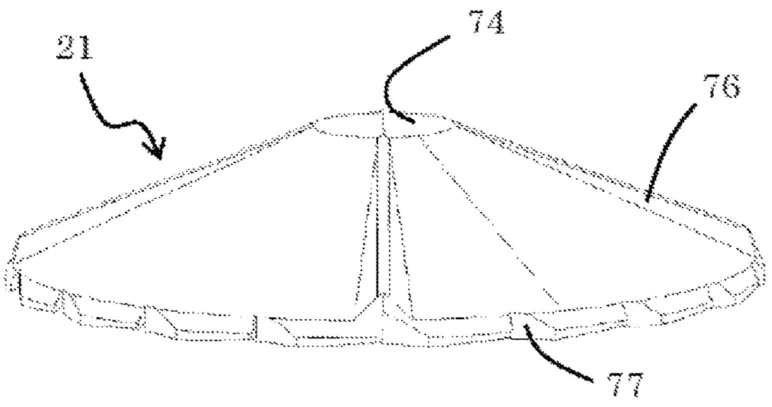
FIGS. 15A and 15B are perspective views, from above and below respectively, of a rotor cover, and FIG. 15(*c*) is a cross-sectional view thereof.
Figure 15B:
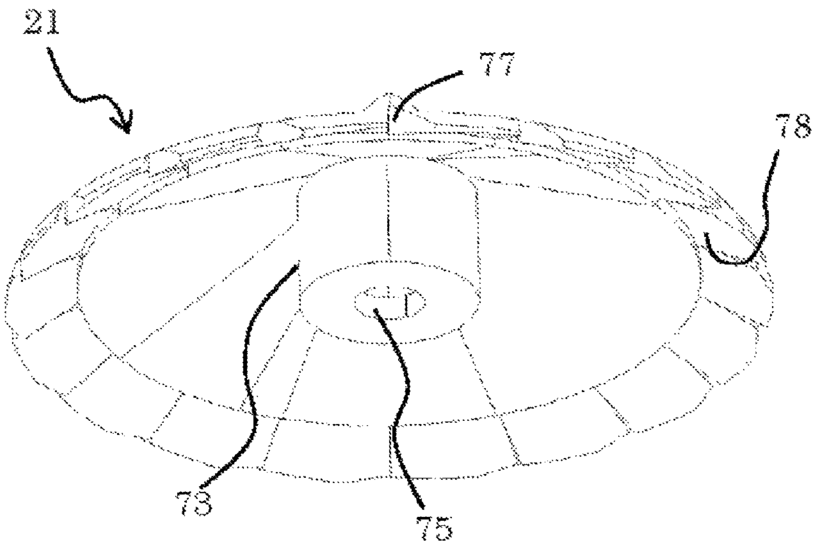
Figure 15C:
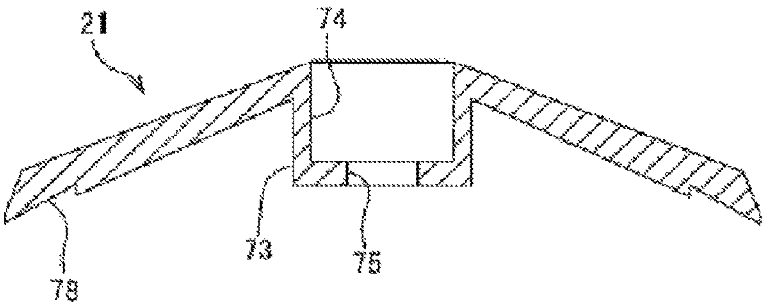

As shown in FIG. 15, the rotor cover 21 is umbrella-shaped as a whole. The top surface of the rotor cover 21 has a gentle slope from the center toward the outer peripheral edge and is sharply inclined as approaching the outer peripheral edge. The diameter of the rotor cover 21 is determined to be a place where the outer peripheral edge of the rotor cover 21 overlaps the top surface of the movable piece upper member 14 even if the movable piece upper member 14 is located at any position between the outermost and innermost positions.

The center of the bottom surface of the rotor cover 21 is provided with a projection 73. The center of the top surface of the rotor cover 21 is provided with a circular recess 74 concentric with the projection 73, and the bottom of the recess 74 is provided with a central hole 75 through which the rotor shaft 26 penetrates.

Radial ribs 76 are formed from the center toward the outer peripheral edge of the rotor cover 21, and are configured to stir tablets stored in the cassette body 2. The rib 76 has a triangular cross-section, the height and width of which increase toward the outer peripheral edge of the rotor cover 21.

The outer peripheral edge of the rotor cover 21 is provided with triangular notches 77 of the same number as the number of the movable piece upper members 14 at equal intervals in the circumferential direction. As shown in detail in FIG. 21, the notch 77 has an edge 77*a* extending radially inward from the outer peripheral edge of the rotor 21 toward the center of the rotor 21, and an edge 77*b* that is formed of a smooth curve extending from the inner end of the edge 77*a* toward the outer end of the edge 77*a* of the adjacent notch 77.

An inner surface 78 of the outer peripheral edge of the rotor cover 21 ranging from one notch 77 to the other notch 77 adjacent to each other has the same shape as the top surface of the movable piece upper member 14, and is formed so as to overlap in close contact with the top surface of the movable piece upper member 14.

Figure 16A:
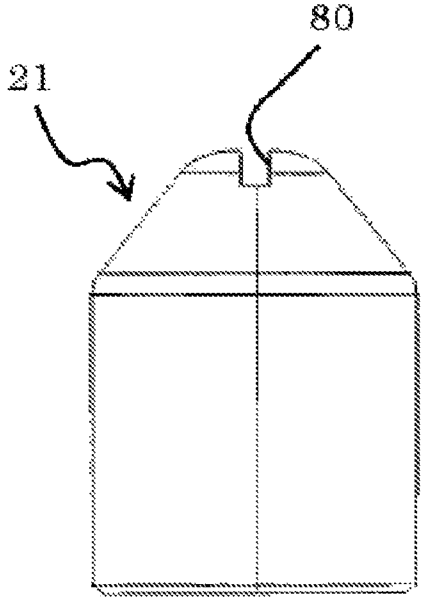
FIGS. 16A and 16B are a perspective view and a cross-sectional view of a rotor cap.
Figure 16B:
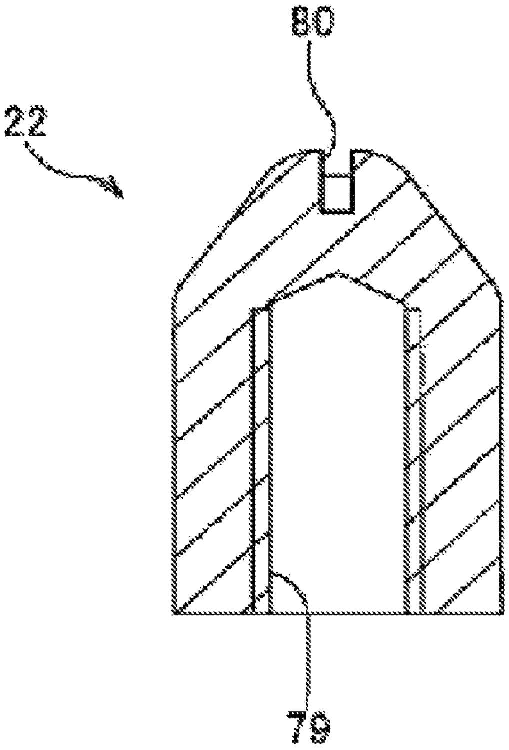

As shown in FIG. 16, the rotor cap 22 has a cylindrical shape, and has an upper end that is closed, a lower end that is opened, and a diameter that fits into the recess 74 of the rotor cover 21. The upper end of the rotor cap 22 has a substantially conical shape that protrudes from the rotor cover 21 when the rotor cap 22 is fitted into the recess 74 of the rotor cover 21. The inner surface of the rotor cap 22 is provided with a female thread 79 that is screwed on the rotor shaft 26. The upper end of the rotor cap 22 is provided with a tool groove 80 with which a tool such as a screwdriver is engaged.

As shown in FIG. 17, the pressing member 4 includes: a rectangular plate-shaped mounting portion 81; a first base 82 that is formed integrally on the inner side of the mounting portion 81 and has an inner surface curved along the outer peripheral surface of the rotor 3; a second base 83 that is formed integrally on the inner side of the first base 82 and has the inner surface curved along the outer peripheral surface of the rotor 3, the second base 83 being slightly smaller than the first base 82; and a pressing rib 84 that is formed integrally on the inner side of the second base 83 and extends in the circumferential direction of the rotor 3.

The mounting portion 81 is located on the outside of the mounting opening 10 of the cassette body 2. One end of the mounting portion 81 is provided with a claw 85 that is engaged with the slit 10*a* of the cassette body 2 when attached, and the other end of the mounting portion 81 is provided with a screw insertion hole 86 that matches the screw hole 10*b* of the cassette body 2 and through which a mounting screw (not shown) is inserted.

The inner surface of the second base 83 is provided at a position where the raised portion 71 of the tablet holding member 20 mounted on the rotor 3 does not contact.

The pressing rib 84 is provided at a height of the second tablet from the lowermost tablet out of tablets entering the tablet guide groove 88. The inner surface of the pressing rib 84 is provided at a position where the inner surface presses the raised portion 71 of the tablet holding member 20 that approaches the pressing rib 84 as the rotor 3 rotates and the pressing portion 72 enters the slit 61 of the second movable plate 18 of the rotor 3.

The front end of the pressing rib 84, that is, the end portion opposite to the tablet holding member 20 that approaches the pressing rib 84 as the rotor rotates, is provided with the inclined surface 87.

The operation of the tablet cassette 1, in particular, the operation of the adjustment of the tablet guide groove, will now be described.

Figure 18:
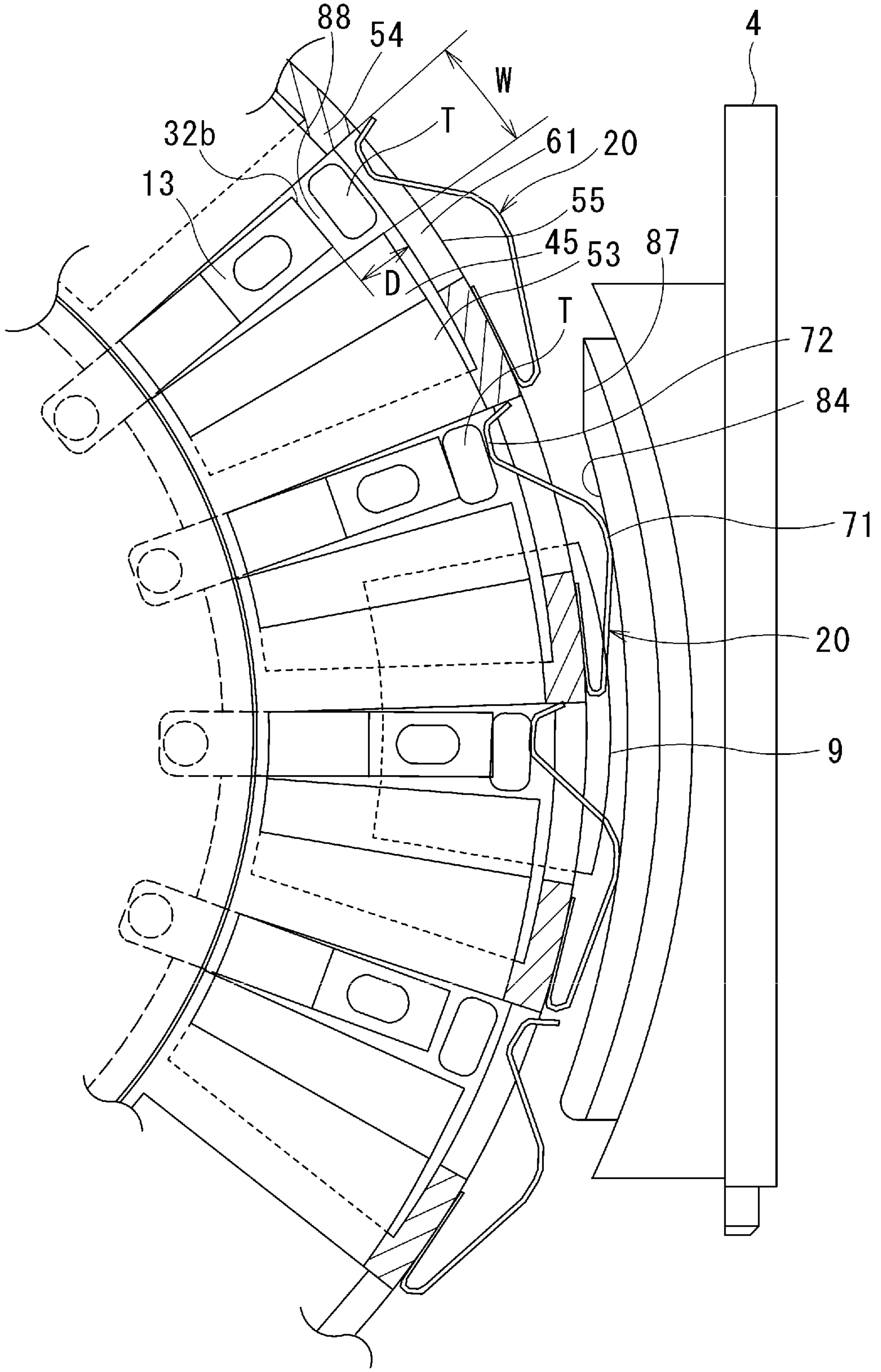
FIG. 18 is a cross-sectional view showing the operation of the pressing member and the tablet holding member.

As shown in FIG. 18, the tablet guide groove 88 of the rotor 3 is formed by a space surrounded by the adjustment wall 45 of the first movable plate 17, the adjustment wall 54 and the outer wall 55 of the second movable plate 18, and the outer surface 32*b* of the movable piece 13, and extends parallel to the axis of the rotor 3. The upper end of the tablet guide groove 88 is in communication with the interior space of the container 5 of the tablet cassette 1, and the lower end thereof is opposed to the bottom of the cassette body 2. When the tablet guide groove 88 reaches a predetermined position as the rotor 3 rotates, the tablet guide groove 88 is communicated with the tablet discharge hole 9.

Tablets T stored in the tablet container 5 of the cassette body 2 enter the tablet guide grooves 88 while being stirred by the rib 76 of the rotor cover 21 as the rotor 3 rotates. When the tablet guide groove 88 approaches the tablet discharge hole 9, the pressing rib 84 of the pressing member 4 presses the tablet holding member 20. This results in that the tablet holding member 20 holds a second tablet T from the bottom out of tablets T entering the tablet guide groove 88, and only the lowermost tablet T is dispensed from the tablet discharge hole 9. Thus, each time the tablet guide groove 88 is rotated to reach the tablet discharge hole 9, the tablet T is dispensed.

The tablet guide groove 88 of the rotor 3 allows a radial dimension of the rotor 3, i.e. groove depth D, and circumferential dimension of the rotor 3, i.e. groove width W to be adjusted depending on the size of the tablet stored in the tablet container 5 of the cassette body 2.

<Adjustment of Tablet Guide Groove Depth>

Figure 19A:
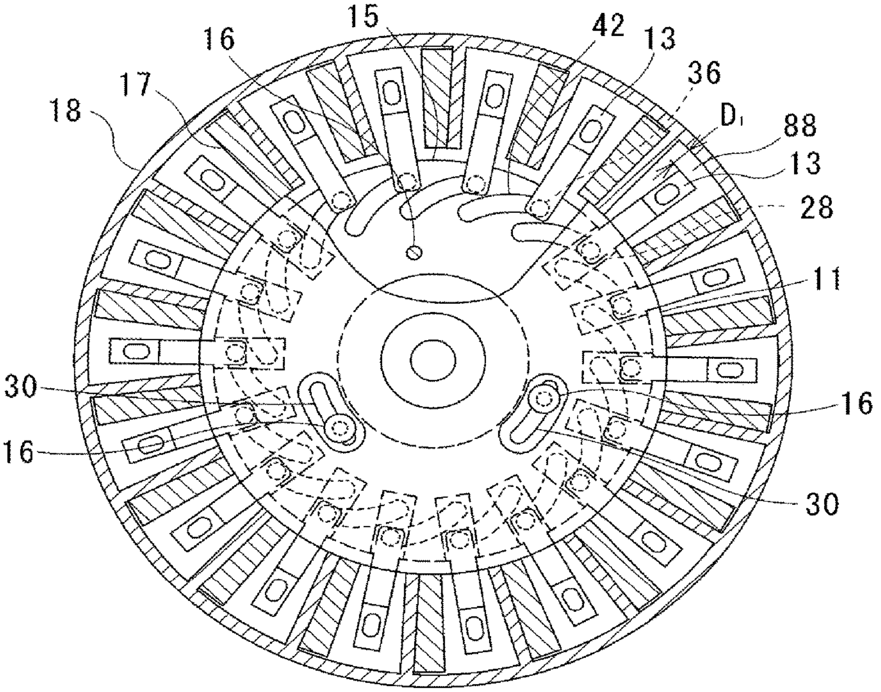
FIGS. 19A and 19B are plan views showing before and after the operation of the adjustment of the groove depth using movable pieces and the movable piece driving plate.
Figure 19B:
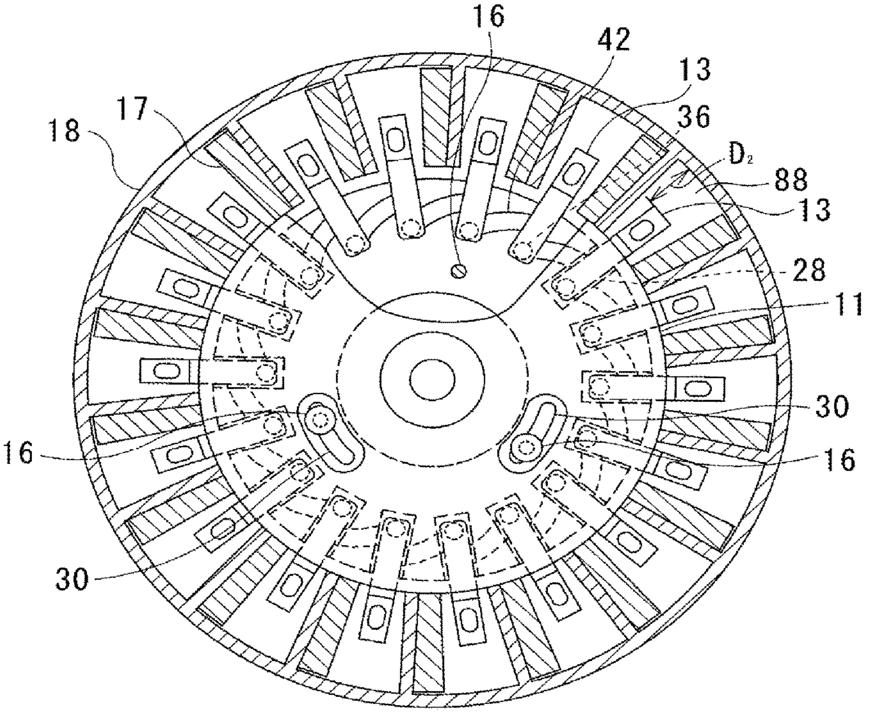

As shown in FIG. 19, a depth D of the tablet guide groove 88 is adjusted by loosening three groove depth adjustment screws 16 and moving them along the arc-shaped elongated holes 30. This allows the movable piece driving plate 15 to rotate to move the guide holes 42. Thus, the projections 36, which are engaged with guide holes 42, are pushed and the movable pieces 13 are moved in the radial direction of the guide groove 28 of the rotor core member 11.

That is, as shown in FIG. 19(*a*), the movable pieces 13 are in a state of minimum depth $D_1$ when the movable pieces 13 are moved radially outward of the rotor 3. When the movable piece driving plate 15 is rotated in the clockwise direction by the adjustment screws 16 from the state of minimum depth $D_1$, the projections 36 of the movable pieces 13 are pushed by the outer edges of the guide holes 42, and this results in a state of maximum depth $D_2$ in which the movable pieces 13 are moved radially inward as shown in FIG. 19(*b*). On the contrary, as shown in FIG. 19(*b*), when the movable piece driving plate 15 is rotated in the counterclockwise direction by the adjustment screws 16 from the state of maximum depth $D_2$, the projections 36 of the movable pieces 13 are pushed by the inner edges of the guide holes 42, and this results in the state of minimum depth $D_1$ in which the movable pieces 13 are moved radially outward as shown in FIG. 19(*a*). Of course, tightening each of the adjustment screws 16 at the intermediate position of the elongated holes 30 allows the tablet guide groove 88 to be adjusted at any depth between the minimum depth $D_1$ and the maximum depth $D_2$.

Figure 20A:
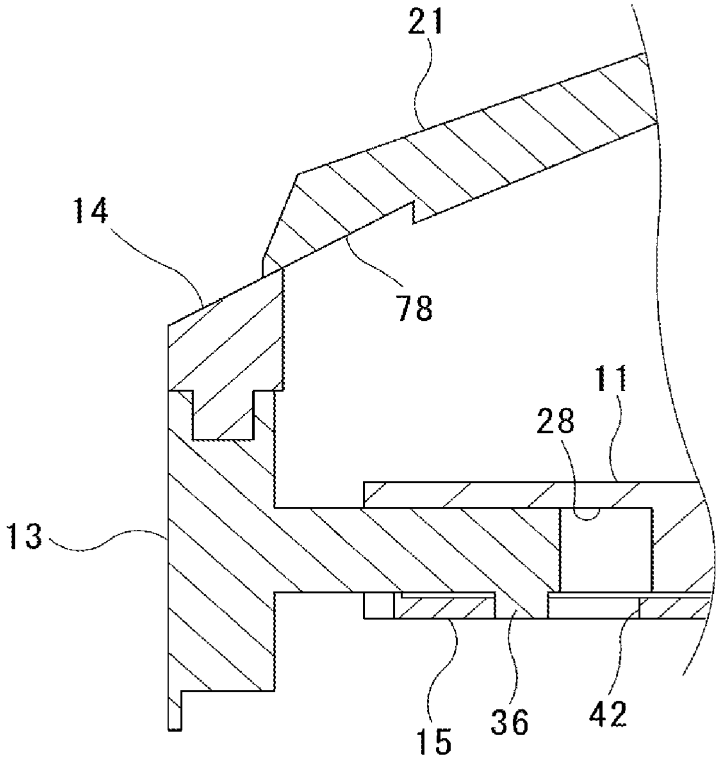
FIGS. 20A and 20B are cross-sectional views showing before and after the operation showing the relationship between the movable piece upper member and the rotor cover.
Figure 20B:
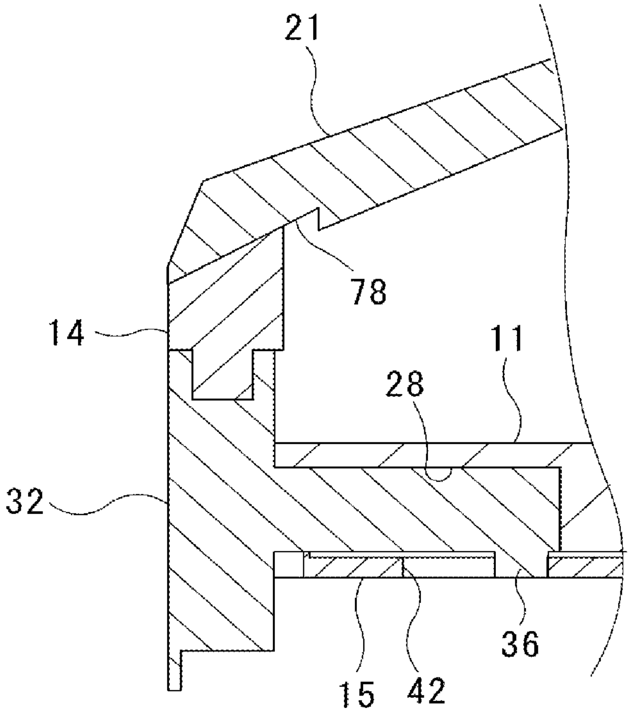

When the movable piece 13 moves in the radial direction, the movable piece upper member 14 also moves in the radial direction. When the movable piece upper member 14 moves radially outward to the utmost extent, as shown in FIG. 20(*a*), the edge of the rotor cover 21 rests on the edge of the movable piece upper member 14. Also as shown in FIG. 20(*b*), when the movable piece upper member 14 moves radially inward, the edge of the rotor cover 21 rests fully on the edge of the movable piece upper member 14. In any event, the inner surface of the outer peripheral edge of the rotor cover 21 has a shape that matches the upper surface of the movable piece upper member 14, overlaps closely with the upper surface of the movable piece upper member 14, and has no gap between the rotor cover 21 and the movable piece upper member 14.

Figure 21:
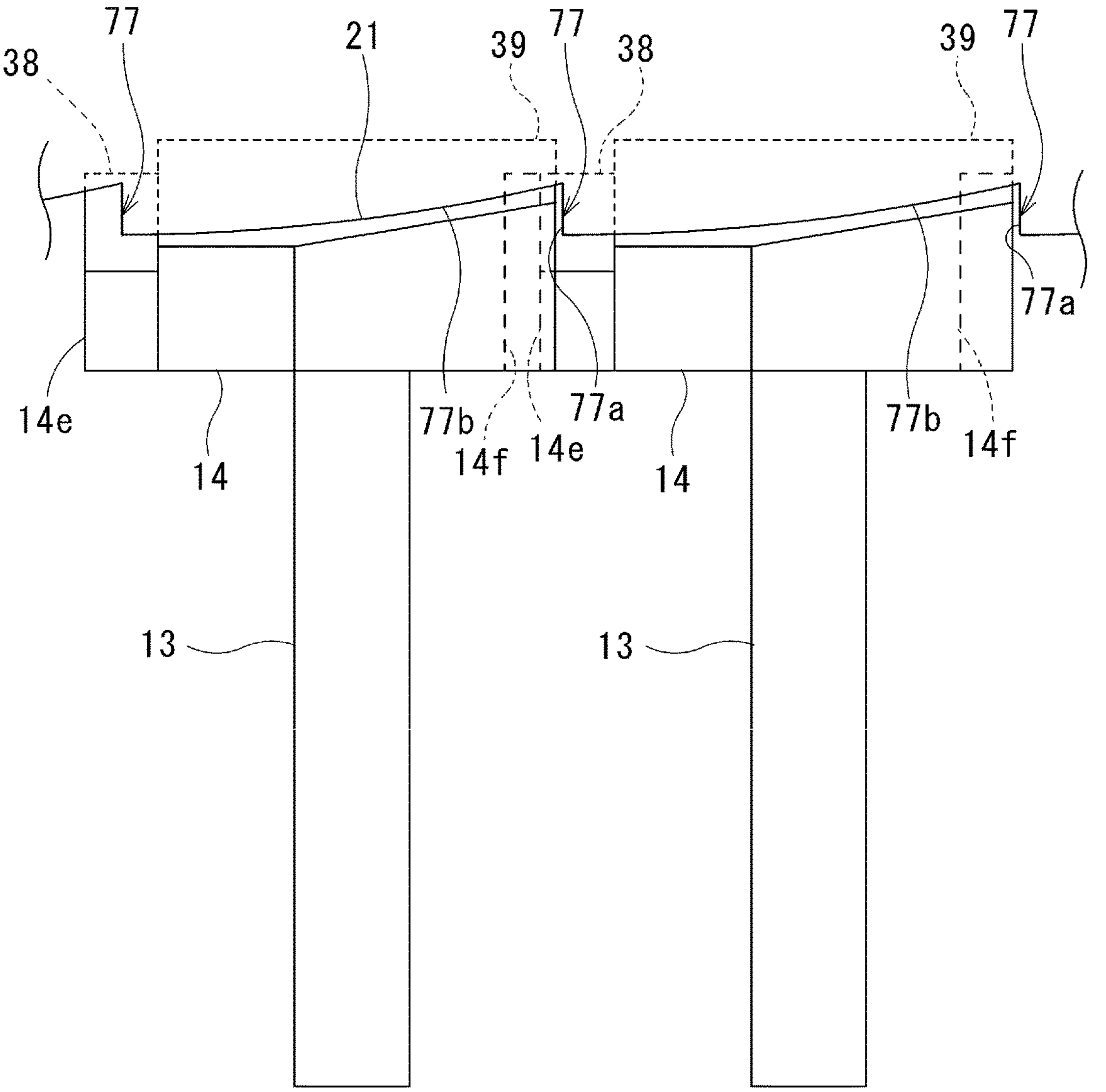
FIG. 21 is a front view showing a change in the gap between adjacent movable piece upper members.
Figure 22A:
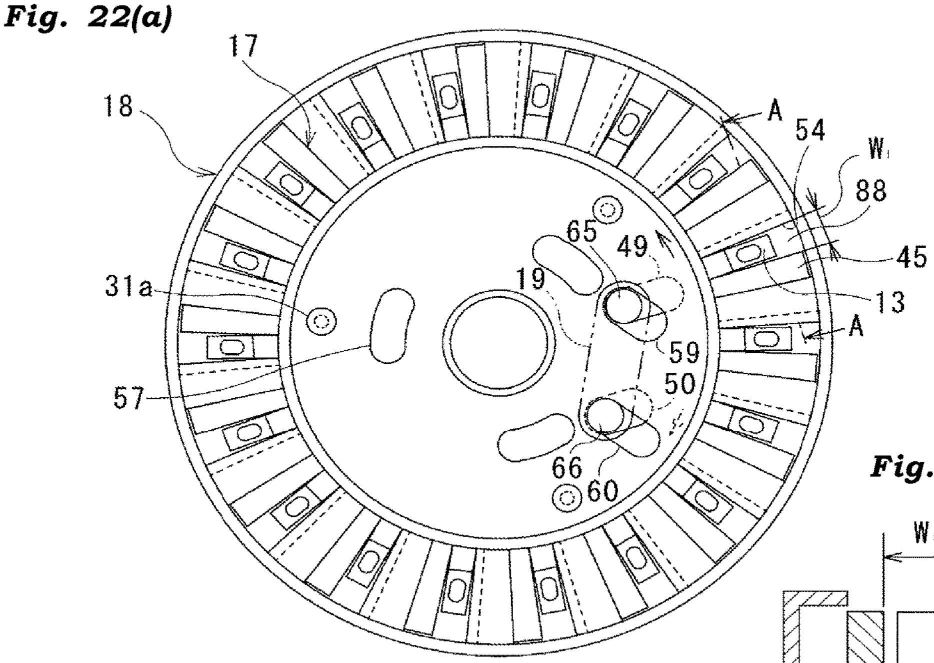
FIGS. 22A and 22B are plan views showing before and after the operation the adjustment of the groove width using a first movable piece and a second movable piece, where
Figure 22C:
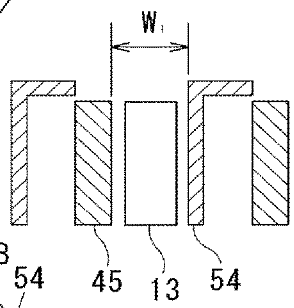
FIGS. 22C and 22D are an A-A cross-sectional view of FIG. 22A and a B-B cross-sectional view of FIG. 22B, respectively.
Figure 22B:
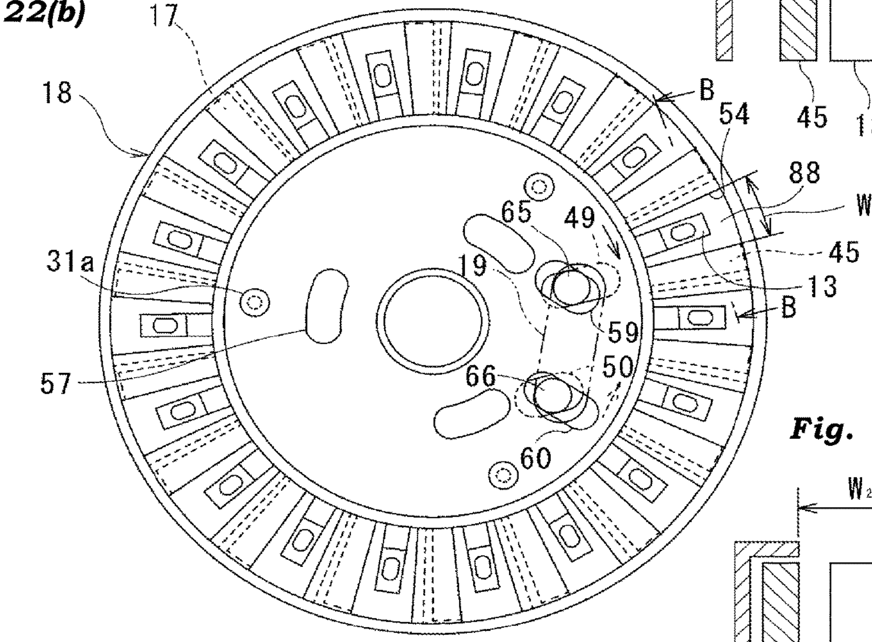
Figure 22D:
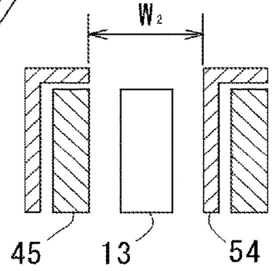

When the movable piece upper member 14 moves radially inward, adjacent movable piece upper members 14 approaches to each other. When the movable piece upper member 14 moves radially outward, adjacent movable piece upper members 14 are separated from each other. In this case, as shown in FIG. 21, the adjacent movable piece upper members 14 have no gap therebetween due to the engagement of the cut-out portion 38 and the projecting portion 39.

<Adjustment of Tablet Guide Groove Width>

In order to adjust the width of the tablet guide groove 88, loosening the three mounting screws 31*a* allows the first movable plate 17 and the second movable plate 18 to be rotatable relative to each other, and the groove width adjustment member 19 is moved radially inward or outward. This allows the first adjustment pin 65 of the groove width adjustment member 19 to press the first adjustment hole 49 of the first movable plate 17 and the third adjustment hole 59 of the second movable plate 18, and allows the second adjustment pin 66 to press the second adjustment hole 50 of the first movable plate 17 and the fourth adjustment hole 60 of the second movable plate 18. As a result, the first movable plate 17 and the second movable plate 18 move relative to each other, and the adjustment wall 45 of the first movable plate 17 and the adjustment wall 54 of the second movable plate 18 move closer to each other or move away from each other.

That is, as shown in FIG. 22(*a*), starting from the state in which the groove width adjustment member 19 is positioned radially inward of the rotor 3, and the gap between the adjustment wall 45 of the first movable plate 17 and the adjustment wall 54 of the second movable plate 18 is a minimum width $W_1$ (see FIG. 22(*c*)), the groove width adjustment member 19 is moved radially outward of the rotor 3. Then the first and second adjustment pins 65, 66 of the groove width adjustment member 19 press the first and second adjustment holes 49, 50 of the first movable plate 17 to rotate them in the clockwise direction, and also press the third and fourth adjustment holes 59, 60 of the second movable plate 18 to rotate them in the counterclockwise direction. Thus, as shown in FIG. 22(*b*), the adjustment wall 45 of the first movable plate 17 and the adjustment wall 54 of the second movable plate 18 are separated, and the groove width is adjusted to get a maximum width $W_2$ (see FIG. 22(*d*)).

On the contrary, as shown in FIG. 22(*b*), when the groove width adjustment member 19 is moved radially inward of the rotor 3 from the state of maximum width $W_2$ (see FIG. 22(*d*)), the first and second adjustment pins 65, 66 of the groove width adjustment member 19 press the first and second adjustment holes 49, 50 of the first movable plate 17 to rotate them in the counterclockwise direction, and also press the third and fourth adjustment holes 59, 60 of the second movable plate 18 to rotate them in the clockwise direction. Thus, as shown in FIG. 22(*a*), the adjustment wall 45 of the first movable plate 17 and the adjustment wall 54 of the second movable plate 18 are separated, and the groove width is adjusted to the minimum width $W_1$ (see FIG. 22(*c*)). Of course, fixing the first and second adjustment pins 65, 66 of the groove width adjustment member 19 at the intermediate positions of the adjustment holes 49, 50, 59, and 60 allows the tablet guide groove 88 to be adjusted at any width between the minimum and maximum widths.

<Adjustment of Tablet Holding Member>

The pressing member 4 may be replaced with another pressing member 4 having the pressing rib 84 located at a different vertical position, depending on the size of tablets stored in the tablet container 5 of the cassette body 2, specifically, according to the height of the tablet entering the tablet guide groove 88. This can select the elastic piece 68 of the tablet holding member 20 pressed by the pressing member 4.

That is, as shown in FIG. 17(*d*), the pressing member 4 whose pressing rib 84 is located at a next higher position than that of FIG. 17(*c*) can press a pressing portion 72 of a second elastic piece 68 from the bottom of the tablet holding member 20. Thus, preparation of four pressing members 4 having differently positioned pressing ribs 84 in advance allows a pressing member 4 having a pressing rib 84 that can press the lower most elastic piece 68 to be selected for small tablets, and allows a pressing member 4 having a pressing rib 84 that can press a higher elastic piece 68 than that to be selected for large tablets, depending on the size of stored tablets.

Note that, instead of replacing an entire pressing member 4, the first base 82 with which the pressing rib 84 is integrally formed may be removably attached to the mounting portion 82 as shown in FIG. 17(*e*), and may be replaced with another first base 82 having a differently positioned pressing rib 84.

The depth as well as the width of the tablet guide groove 88 are adjusted in the above-described embodiment. Alternatively, either the depth or the width of the groove may be adjusted.

While the tablet holding member 20 has four elastic pieces 68, any number of elastic pieces 68 or a single elastic piece 68 may be provided. If a tablet holding position is adjusted by using a tablet holding member 20 having a single elastic piece 68, a structure may be used in which the tablet holding member 20 is replaced with another tablet holding member 20 or the position of the elastic piece 68 is vertically modified.

While the pressing member 4 is assumed to have a fixed pressing rib 84, the pressing rib 84 may be moved vertically according to the height of the elastic piece 68 of the tablet holding member 20. In this way, no replacement of the pressing member 4 is required.

A rotor provided with conventional tablet guide grooves having a constant depth and width may be used when the tablet holding member 20 and the pressing member 4 are used.

Furthermore, while moving operation of adjustment screws 16, i.e., a groove depth adjusting mechanism, rotates the movable piece driving plate 15 to move the movable pieces 13 in the embodiment above, rotating operation of a dial or the like may rotate the movable piece driving plate 15. Likewise, while the moving operation of the groove width adjustment members 19, i.e., the groove width adjustment mechanism, rotates the first movable plate 17 and the second movable plate 18, rotating operation of a dial or the like may rotate the first movable plate 17 and the second movable plate 18.

DESCRIPTION OF SYMBOLS

1 Tablet cassette
2 Cassette body
3 Rotor
4 Pressing member
9 Tablet discharge hole
11 Rotor core member
13 Movable piece
15 Movable piece driving plate
16 Groove depth adjustment screw
17 First movable plate
18 Second movable plate
19 Groove width adjustment member
20 Tablet holding member
28 Guide groove
42 Guide hole
45 Adjustment wall
49 First adjustment hole
50 Second adjustment hole
54 Adjustment wall
59 Third adjustment hole
60 Fourth adjustment hole
68 Elastic piece
71 Raised portion
72 Pressing portion
88 Tablet guide groove

The invention claimed is:

1. A rotor for a tablet cassette rotatably disposed in a cassette body, the rotor comprising:

a plurality of tablet guide grooves extending in a rotation axial direction so that the tablets contained in the cassette body are discharged through the tablet guide grooves, wherein:

first and second side surfaces of each of the plurality of tablet guide grooves are formed by first and second movable plates which are movable relative to one another in a circumferential direction of the rotor, the first movable plate defining a first adjustment hole and a second adjustment hole, the second movable plate defining a third adjustment hole and a fourth adjustment hole; and a groove width adjustment mechanism configured to move the movable plates in the circumferential direction of the rotor relative to one another to adjust a width of each of the plurality of tablet guide grooves in response to a size of the tablet, the groove width adjustment mechanism including an operating member having a first adjustment pin, a second adjustment pin, and a base interconnecting the first and second adjustment pins, the first adjustment pin passing through the first and third adjustment holes, the second adjustment pin passing through the second and fourth adjustment holes.

2. A tablet cassette comprising:

a cassette body for storing tablets;

a rotor rotatably disposed in a bottom portion of a tablet container of the cassette body, the rotor being formed with a plurality of tablet guide grooves extending in a rotation axial direction, first and second side surfaces of each of the plurality of tablet guide grooves formed by first and second movable plates which are movable relative to one another in a circumferential direction of the rotor, the first movable plate defining a first adjustment hole and a second adjustment hole, the second movable plate defining a third adjustment hole and a fourth adjustment hole; and a groove width adjustment mechanism configured to move the first and second movable plates in a circumferential direction of the rotor to adjust the width of each of the plurality of tablet guide grooves in response to the size of the tablet, the groove width adjustment mechanism including an operating member having a first adjustment pin, a second adjustment pin, and a base interconnecting the first and second adjustment pins, the first adjustment pin passing through the first and third adjustment holes, the second adjustment pin passing through the second and fourth adjustment holes.

3. The tablet cassette according to claim 2, wherein the first movable plate has a plurality of first adjustment walls, each of the plurality of first adjustment walls having the first side surface that forms one side of each of the plurality of tablet guide grooves; and the second movable plate rotatably disposed relative to the first movable plate and having a plurality of second adjustment walls, each of the plurality of second adjustment walls having the second side surface that forms an other side of each of the plurality of tablet guide grooves opposed to the first side surface of the first movable plate.

4. The tablet cassette according to claim 2, wherein the third adjustment hole intersects the first adjustment hole and the fourth adjustment hole intersecting the second adjustment hole.

* * * * *